United States Patent [19]

Davis et al.

[11] 4,329,225
[45] May 11, 1982

[54] MIXED BED DEIONIZER

[75] Inventors: Stephen H. Davis, Dayton; Daniel W. Simpson, Fairfield, both of Ohio

[73] Assignee: Water Refining Company, Inc., Middletown, Ohio

[21] Appl. No.: 220,325

[22] Filed: Dec. 29, 1980

[51] Int. Cl.³ .............................................. B01J 49/00
[52] U.S. Cl. .................................. 210/96.1; 210/678; 210/686; 210/190; 210/278; 210/289; 521/26
[58] Field of Search ............... 210/662, 670, 678, 686, 210/96.1, 140, 190, 191, 269, 274, 275, 277–279, 287–291; 521/26

[56] References Cited

U.S. PATENT DOCUMENTS

| | | | |
|---|---|---|---|
| 2,666,741 | 1/1954 | McMullen | 210/686 |
| 2,771,424 | 11/1956 | Stromquist et al. | 210/686 |
| 3,208,476 | 9/1965 | Clack | 210/190 |
| 3,467,255 | 9/1969 | Whitlock | 210/190 |
| 3,527,718 | 9/1970 | Coburn | 210/686 |
| 3,531,402 | 9/1970 | Thompson | 210/190 |
| 3,658,180 | 4/1972 | Prosser | 210/96.1 |

Primary Examiner—Ivars C. Cintins
Attorney, Agent, or Firm—Biebel, French & Nauman

[57] ABSTRACT

A mixed bed deionizer unit which provides in situ regeneration through the use of two compact multi-valve assemblies and an intermediate manifold which are automatically controlled to supply backwash water, chemical draw for cleansing both cation and anion resins simultaneously and rinsing water in a sequentially controlled manner. An internal water and chemical distribution system in the mixed bed tank is provided which has both input distribution and output drainage capabilities.

8 Claims, 46 Drawing Figures

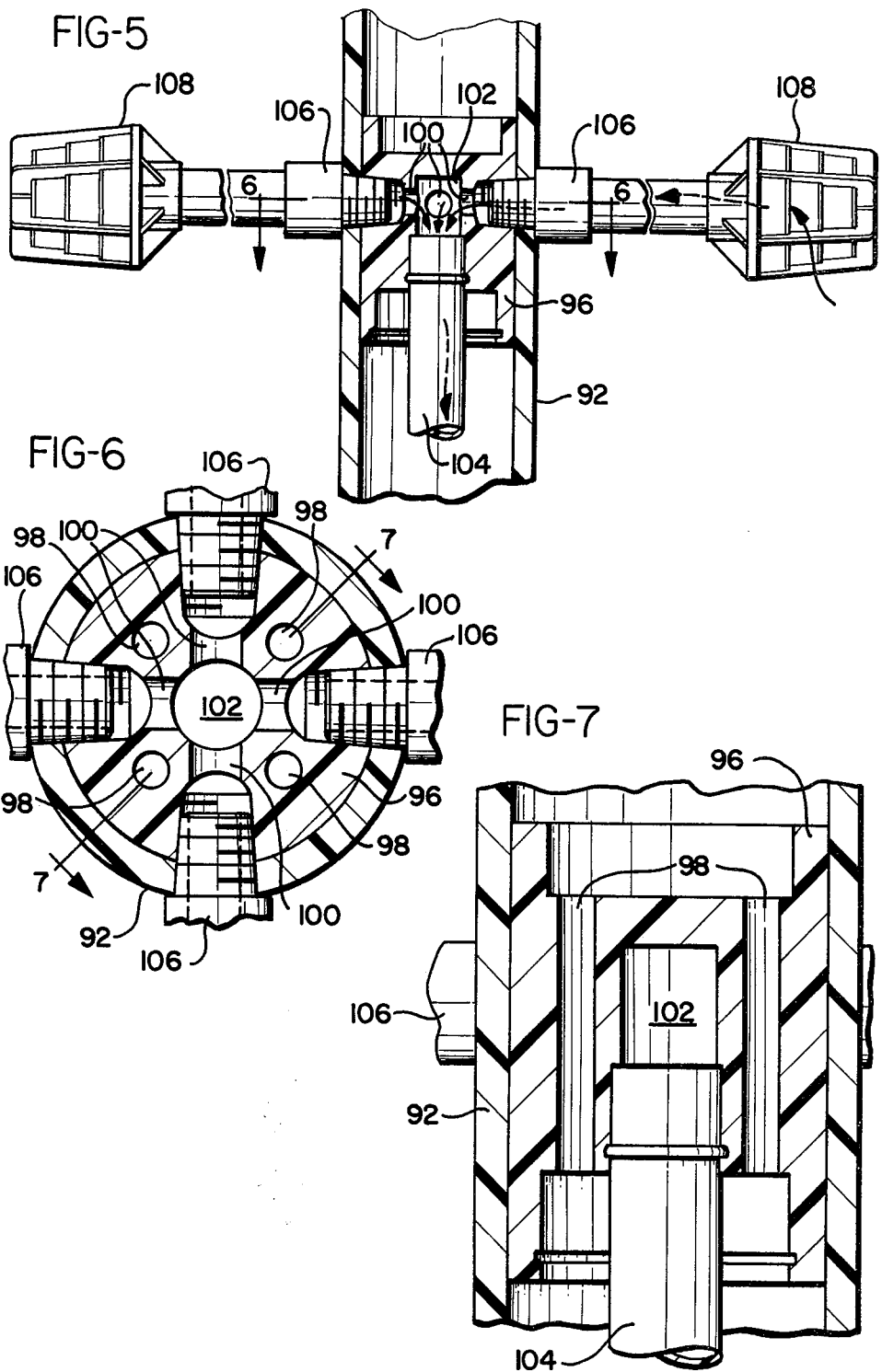

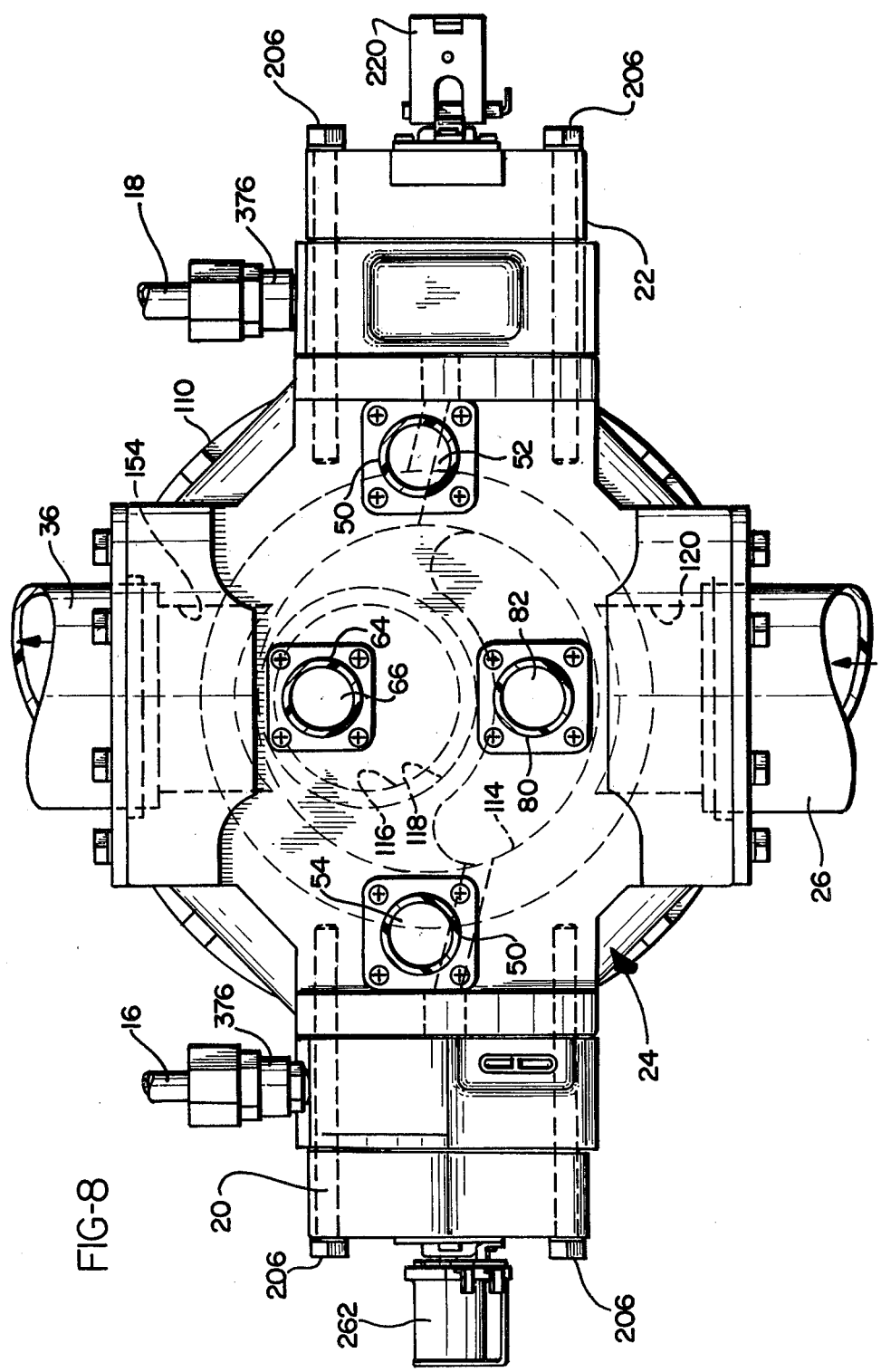

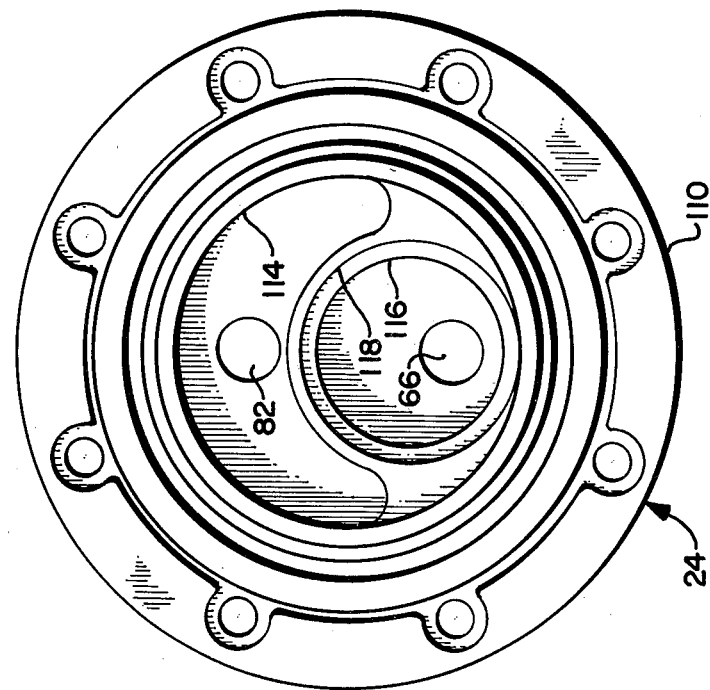
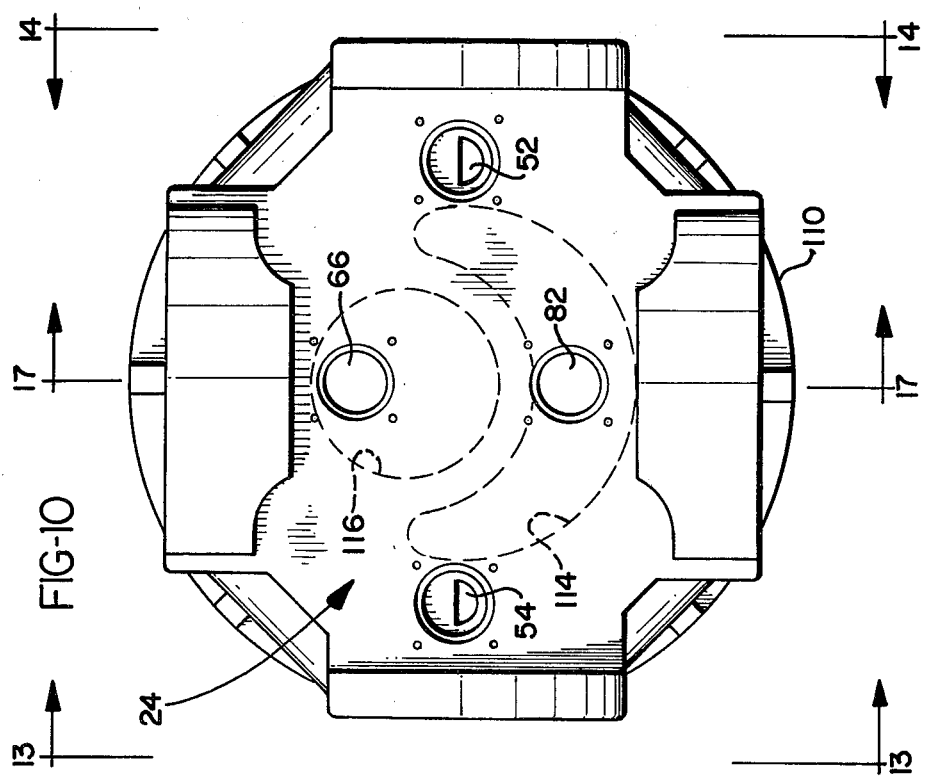

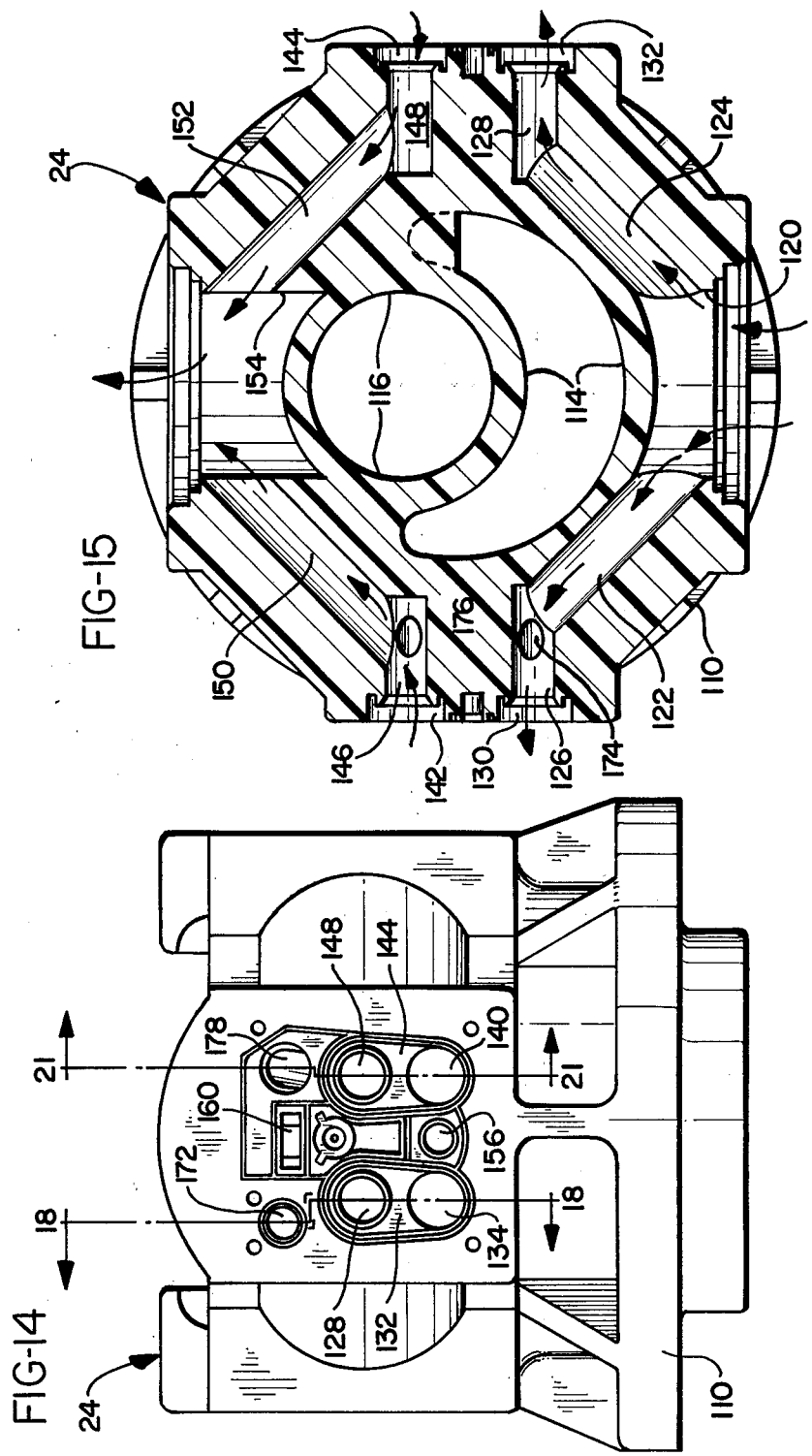

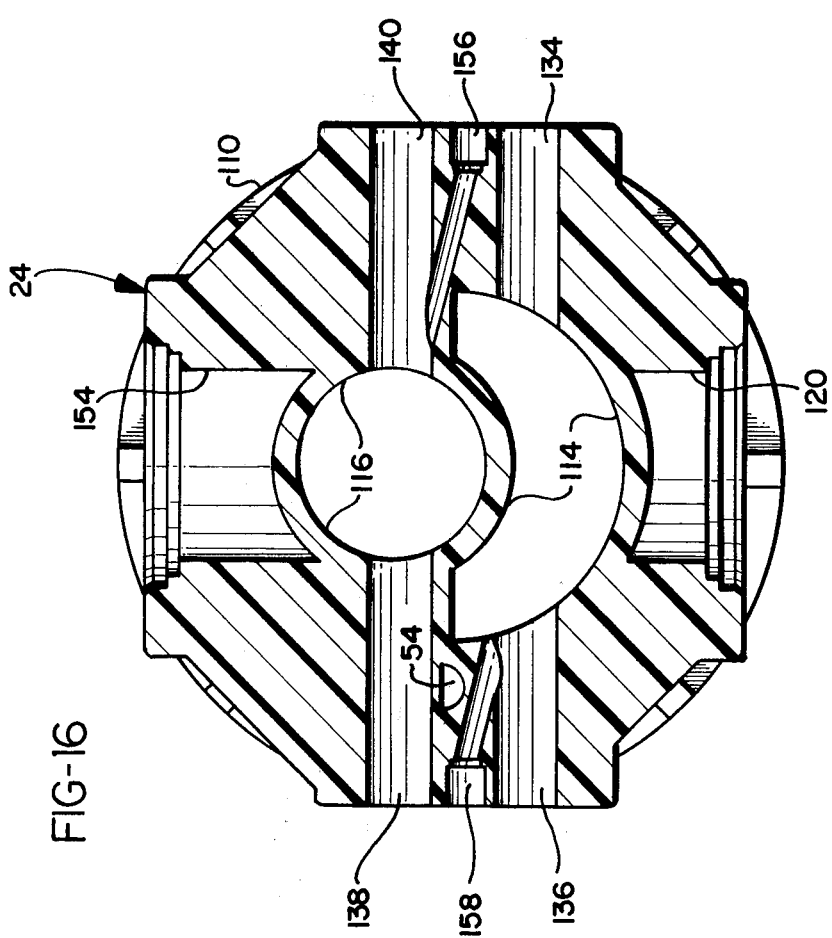

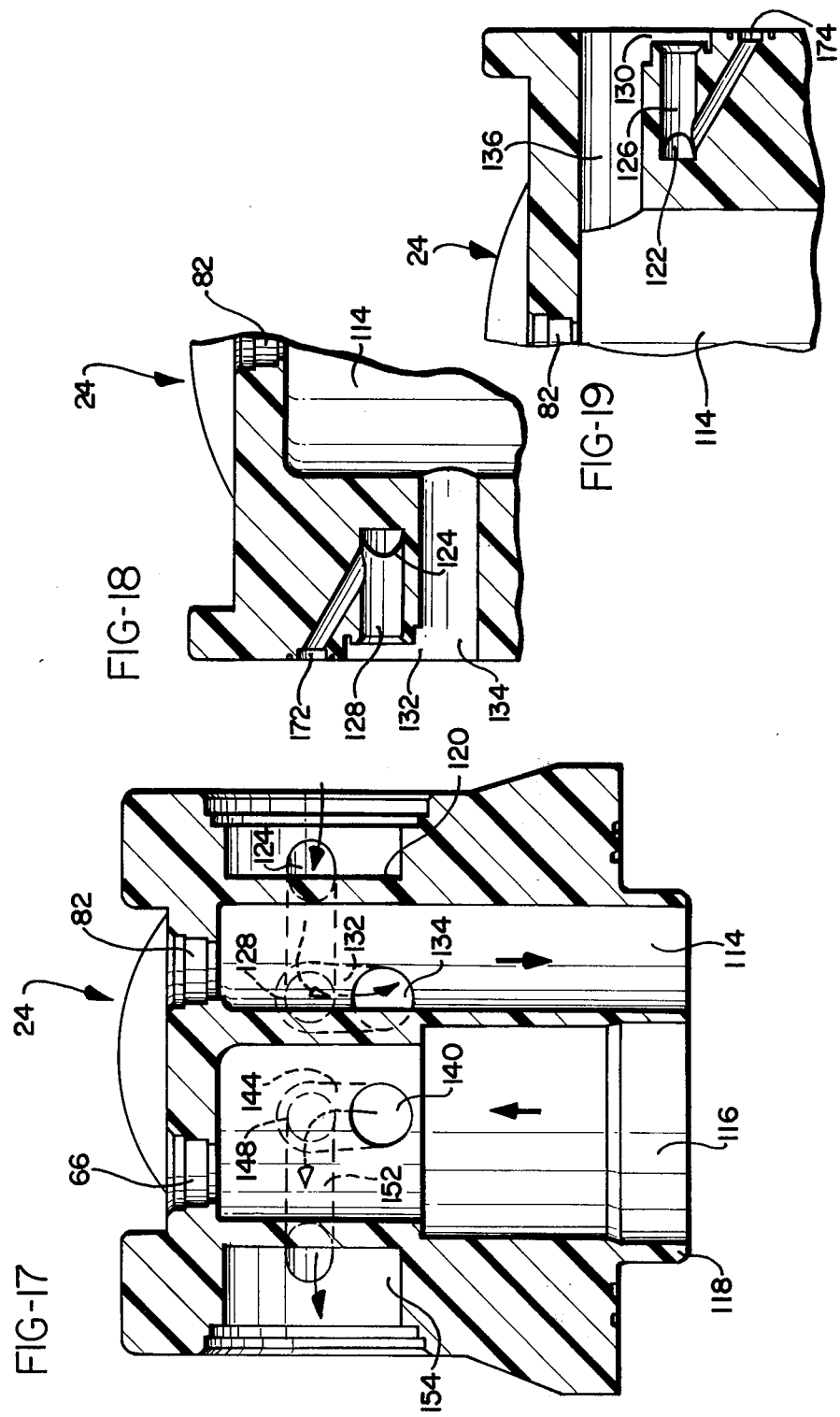

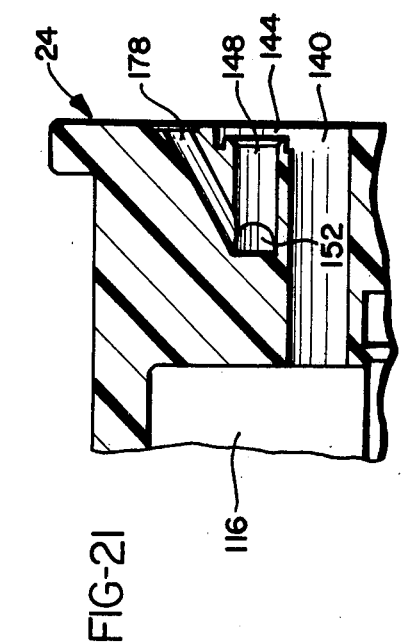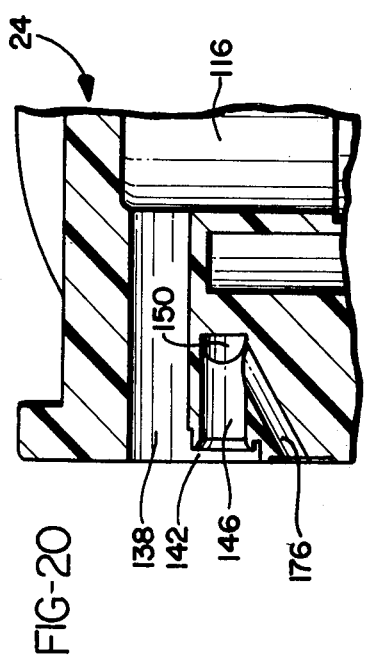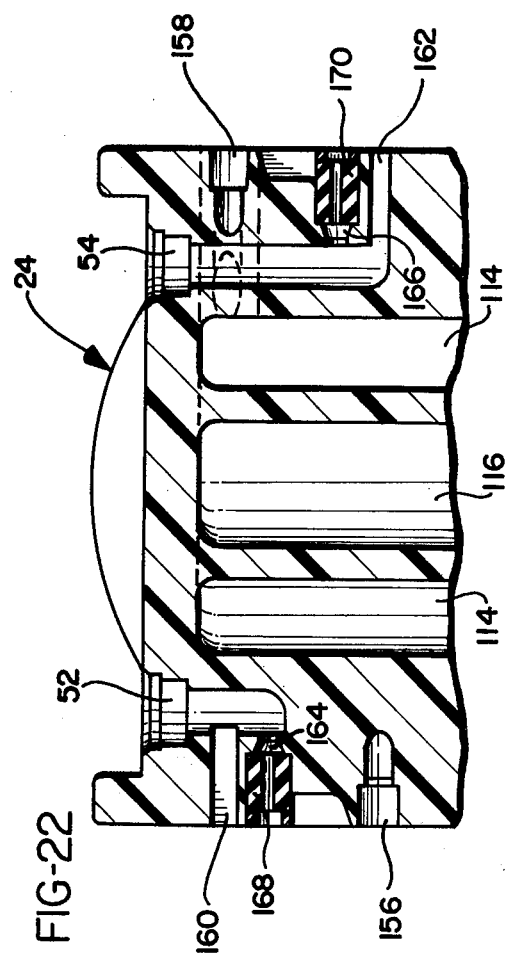

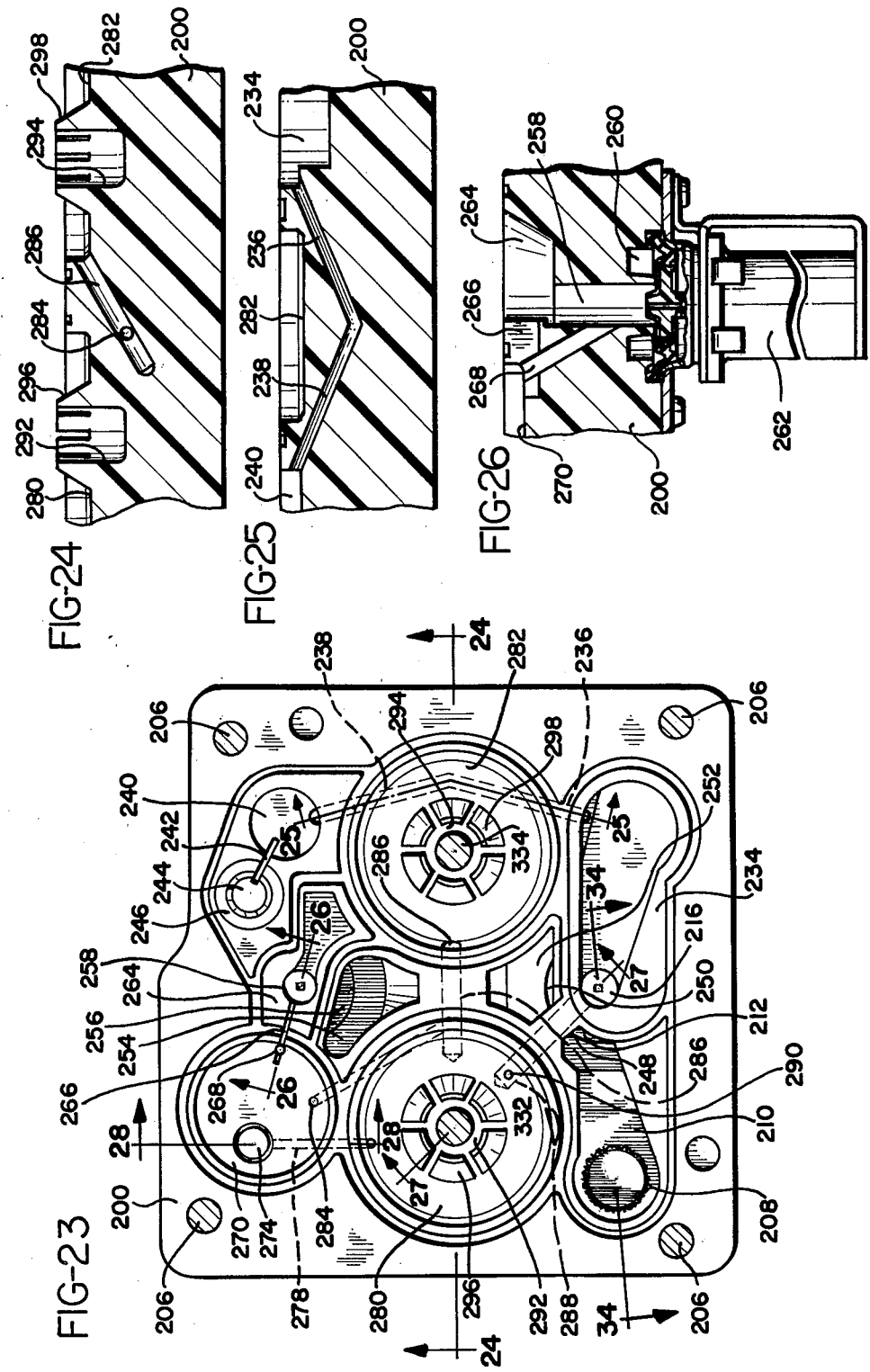

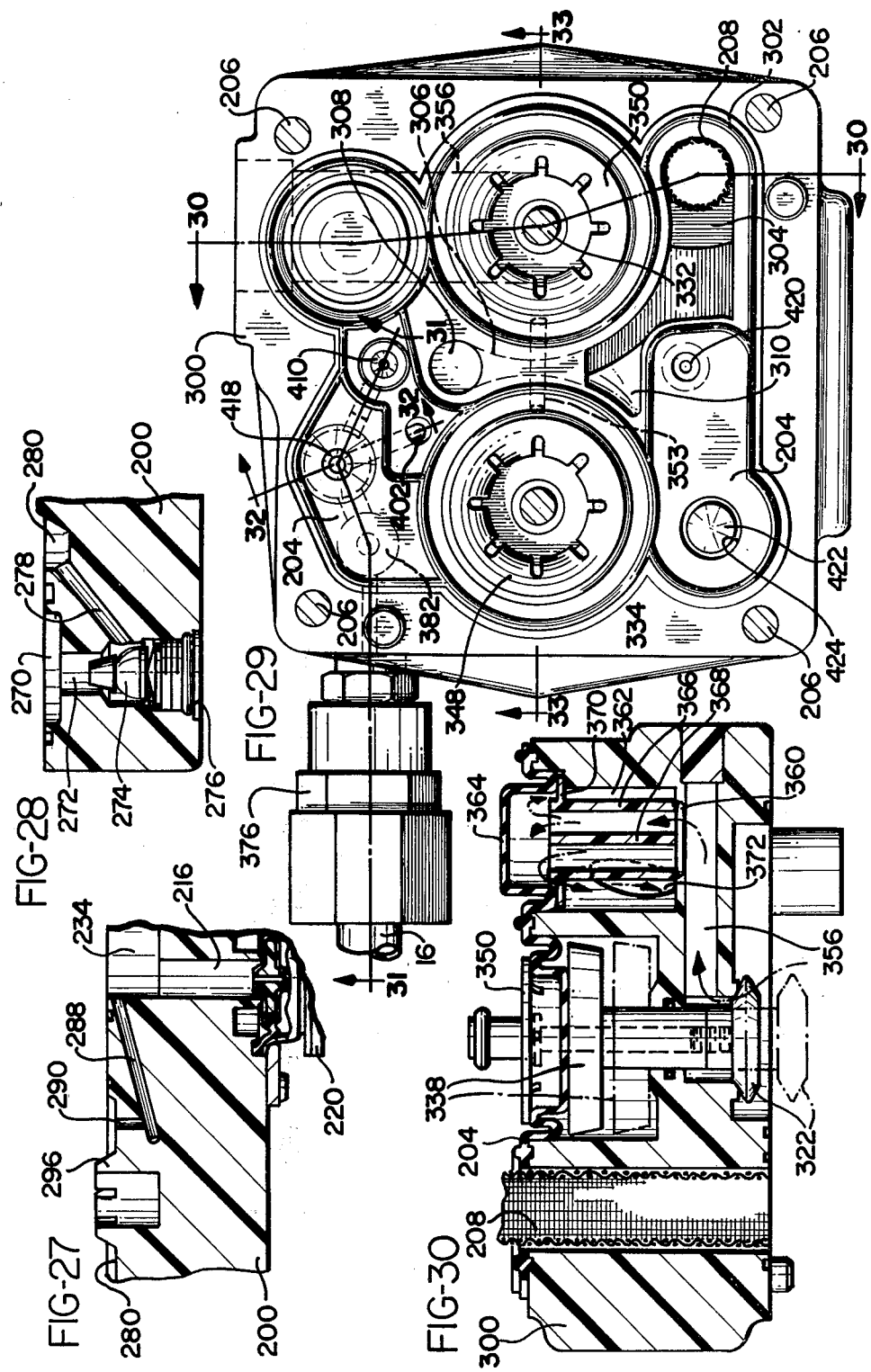

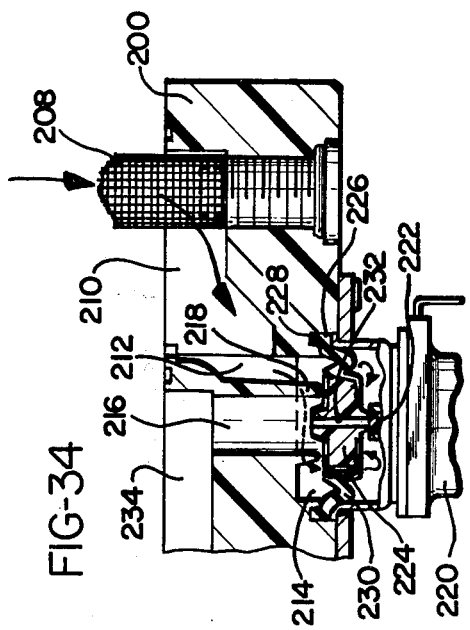
FIG-34
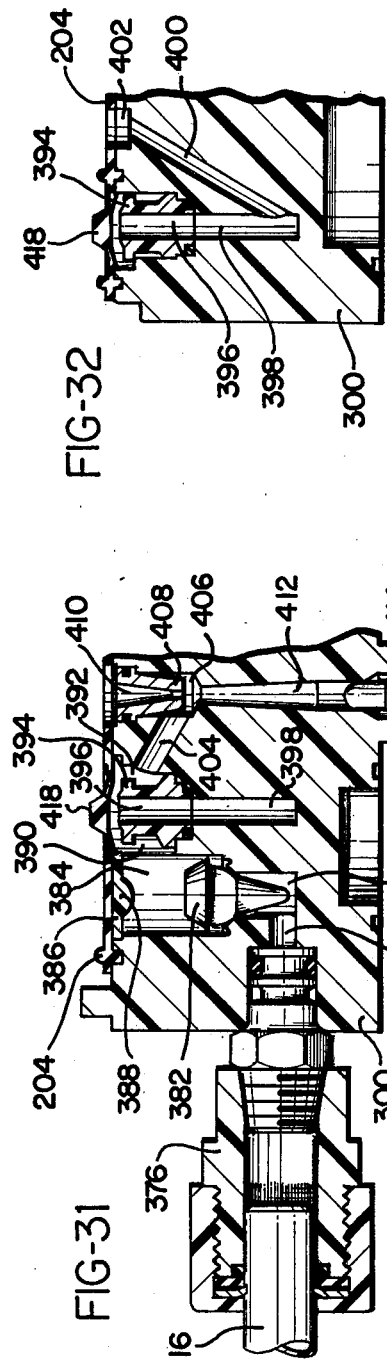
FIG-32
FIG-31
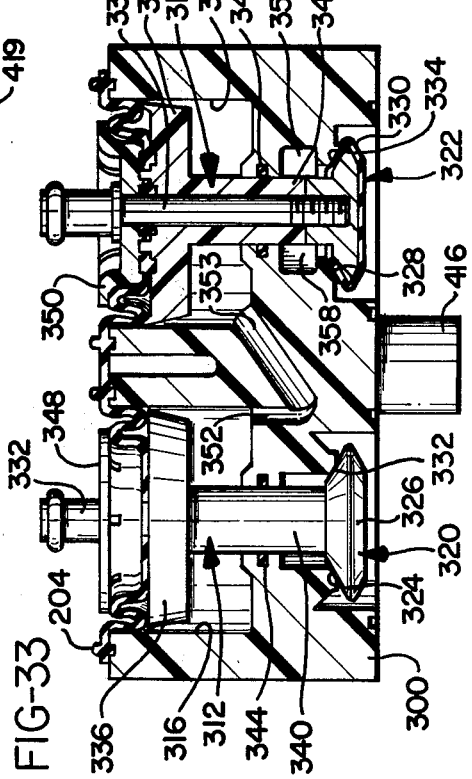
FIG-33

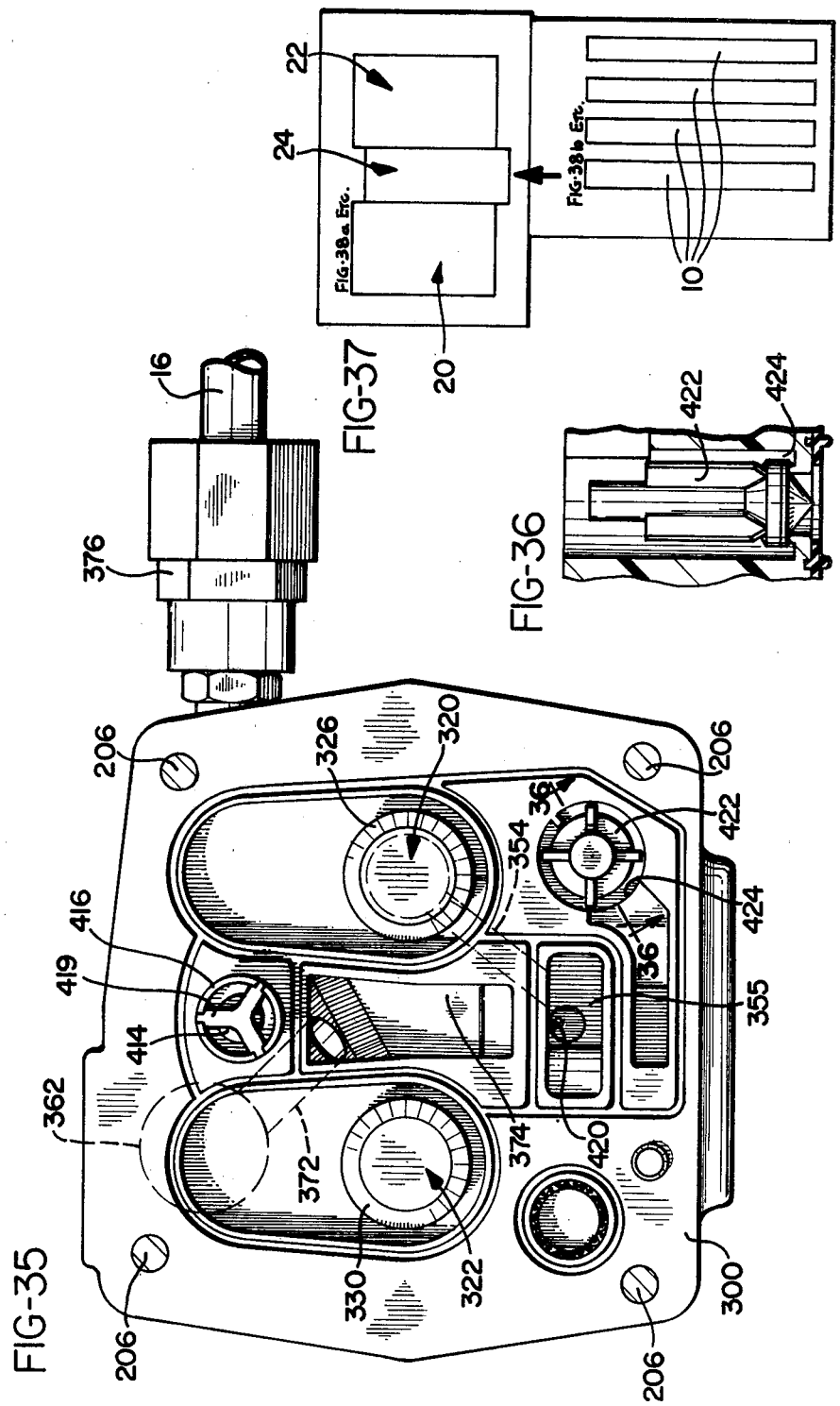

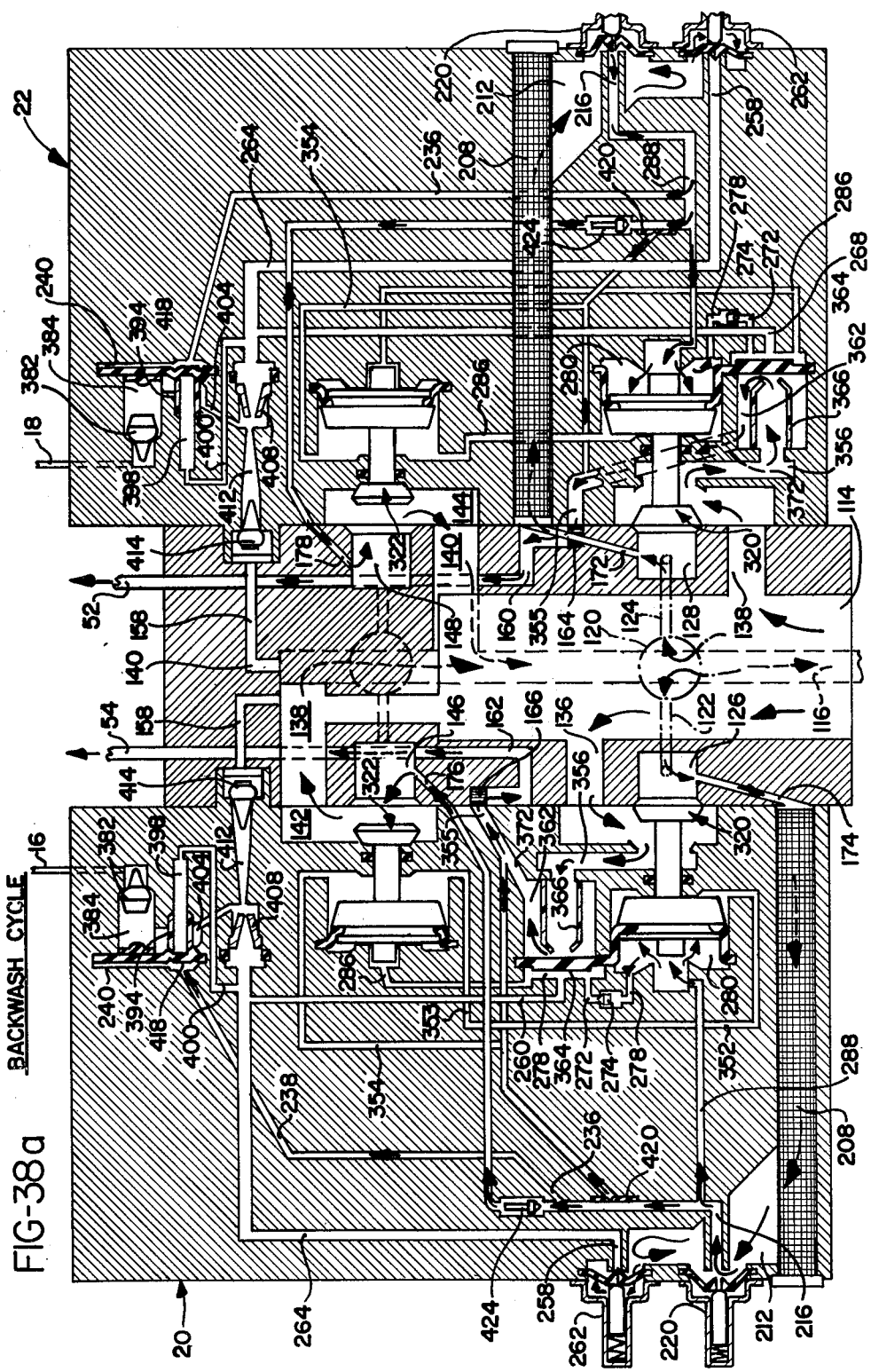

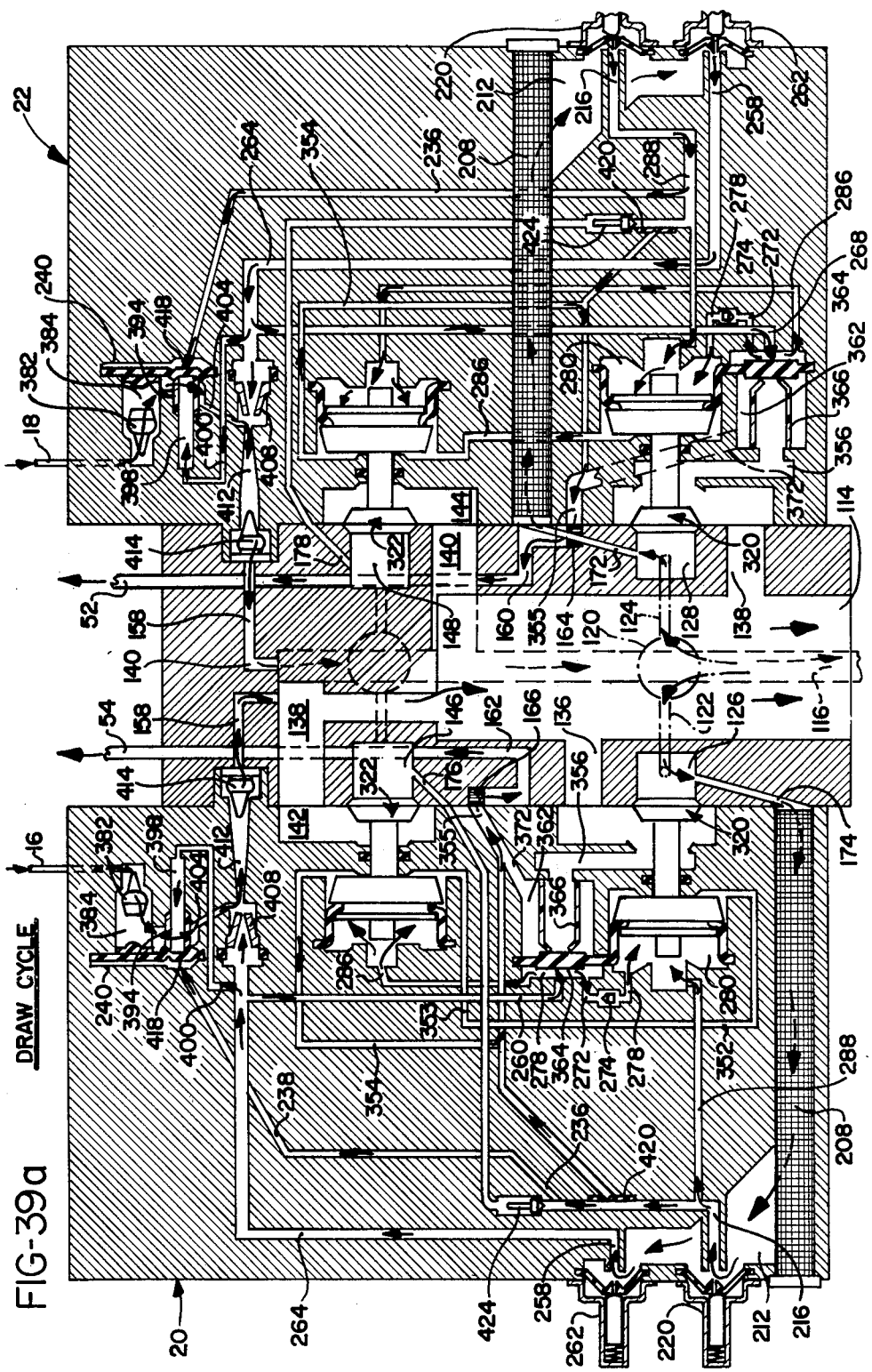

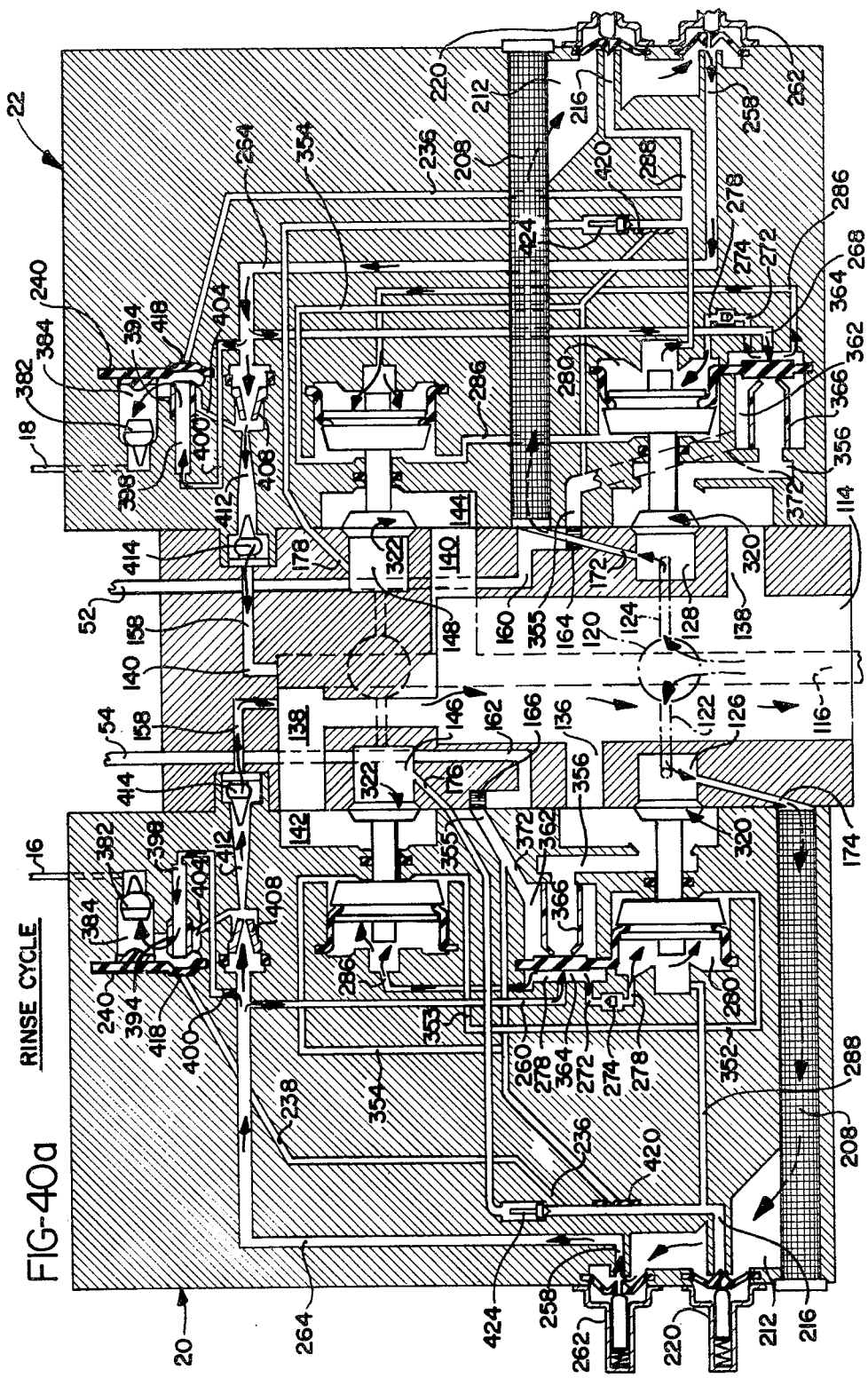

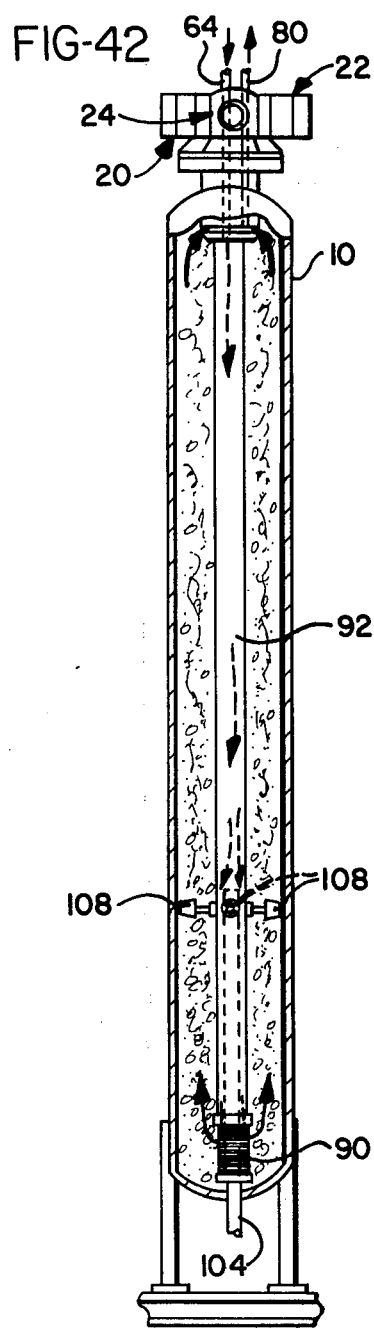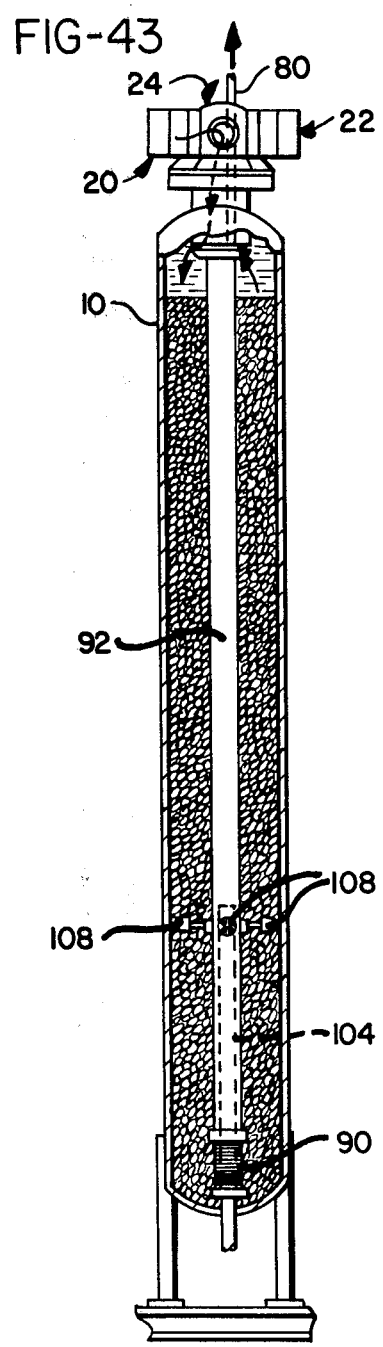

MIXED BED DEIONIZER

BACKGROUND OF THE INVENTION

1. Field of the Invention

The present invention relates to mixed bed deionizing units and, more particularly, to means for controlling the in situ regeneration of the mixed bed resins.

2. Prior Art

For the purposes of this invention, mixed bed deionizers can be generally grouped into two types, those which have their resins removed for recharging and those which have their resins regenerated within the deionizer tank. The present invention relates to the latter type in which a system of valves, drain pipes and regenerating fluid distribution conduits are necessary for regenerating the resins in situ.

In this type of device, during service the cation and anion resins are relatively uniformly mixed throughout the deionizer tank. To regenerate the resins they are initially backwashed to remove the turbitity and separate the cation and anion resins due to their size and density differences. It is also common to use an intermediate inert resin of lesser quantity than the anion and cation resins and which, upon backwash, settles out to a position intermediate the anion and cation resins to act as a buffer zone during regeneration.

In such devices, the resins settle in the tank after backwash with first the anion resin, then the inert resin, and finally the cation resin, going from the top to the bottom of the tank. The inert resin settles out in the tank at a position where an intermediate collector extends into the tank for withdrawing the anion and cation regeneration fluids which are respectively introduced from the top and bottom of the tank and flow through the anion and cation levels to the inert intermediate level and are withdrawn through the collector system and passed to drain.

All of these mixed bed deionizers which regenerate in situ utilize an extremely complex and expensive external piping and valve arrangement in order to introduce and withdraw the regeneration chemicals and backwash and rinse liquids at the proper locations in the bed and in an appropriately timed sequence. The initial set-up expenses of such devices are a major portion of their cost because of the labor required to put together all of the pipes, valves and electrical control equipment for each installation. In addition, there are a large number of valves associated with each mixed bed deionizer which also is a substantial portion of the cost of an installation.

A major problem associated with such prior art mixed bed deionizers and their control systems lies in the inability to determine the exact location in this complex networks of piping and valves where a malfunction occurs. It sometimes becomes necessary to dismantle almost the entire system and check each component to locate the fault.

SUMMARY OF THE INVENTION

The present invention overcomes the above described difficulties and disadvantages associated with prior art mixed bed deionizers which are regenerated in situ, by eliminating most of the external piping and valving associated with such deionizers. The present invention, instead, utilizes a unique manifolding arrangement in conjunction with two multi-functional valve elements which together control the flow of liquids through the deionizer bed. In addition, a unique internal distribution system is provided which injects and withdraws the various liquids from the deionizer tank.

BRIEF DESCRIPTION OF THE DRAWINGS

FIG. 5 is an enlarged vertical cross sectional view of the collector assembly and central distribution pipe of the present invention;

FIG. 6 is a horizontal cross sectional view along line 6—6 of FIG. 5;

FIG. 7 is an enlarged vertical cross sectional view in the direction of line 7—7 of FIG. 6;

FIG. 8 is a top plan view of the manifold of the present invention with the two main valve assemblies mounted thereto;

FIG. 10 is a top plan view of the manifold without the main valve assemblies secured thereto;

FIG. 11 is a bottom view of the manifold of FIG. 10;

FIG. 14 is a right side elevational view, looking in the direction of line 14—14 of FIG. 10, of the manifold which, in the preferred embodiment, is the acid liquid input side;

FIG. 15 is a cross sectional view looking in the direction of line 15—15 of FIG. 12;

FIG. 16 is a cross sectional view of the manifold looking in the direction of line 16—16 of FIG. 20;

FIG. 17 is a vertical cross sectional view looking in the direction of line 17—17 of FIG. 10;

FIG. 18 is a partial cross sectional view looking in the direction of the offset line of 18—18 in FIG. 14;

FIG. 19 is a partial cross sectional view looking in the direction of offset line 19—19 of FIG. 13;

FIG. 20 is a partial cross sectional view along the offset line 20—20 of FIG. 13;

FIG. 21 is a partial cross sectional view looking in the direction of offset line 21—21 in FIG. 14;

FIG. 22 is a partial cross sectional view looking in the direction of line 22—22 of FIG. 13;

FIG. 23 is a bottom view, looking in the direction of line 23—23 of FIG. 9, of the upper section of one of the multi-function valve units of the preferred embodiment with the gasket intermediate the top portion and middle portion of the valve unit being removed;

FIG. 24 is a partial cross sectional view in the direction of line 24—24 of FIG. 23;

FIG. 25 is a partial cross sectional view along the offset line 25—25 of FIG. 23;

FIG. 26 is a partial cross sectional view in the direction of line 26—26 of FIG. 23;

FIG. 27 is a partial cross sectional view in the direction of line 27—27 of FIG. 23;

FIG. 28 is a partial cross sectional view in the direction of line 28—28 of FIG. 23;

FIG. 29 is a top plan view of the middle section of one of the multi-function valve assemblies of the present invention with the intermediate gasket between the upper and middle sections in place and looking in the direction of line 29—29 of FIG. 9;

FIG. 30 is a cross sectional view in the direction of offset line 30—30 of FIG. 29;

FIG. 31 is a partial cross sectional view along the offset line 31—31 of FIG. 29;

FIG. 32 is a partial cross sectional view along the line 32—32 of FIG. 29;

FIG. 33 is a cross sectional view along the line 33—33 of FIG. 29;

FIG. 34 is a partial cross sectional view in the direction of line 34—34 of FIG. 23;

FIG. 35 is a bottom view of the intermediate section of one of the multi-function valve assemblies of the present invention, looking in the direction of line 35—35 of FIG. 9;

FIG. 36 is a partial cross sectional view looking in the direction of line 36—36 of FIG. 35;

FIG. 37 illustrates the manner in which each of the individual FIGS. 38b, 39b and 40b should be positioned respectively on FIGS. 38a, 39a and 40a to show the occurrence within the deionizer tank when the valves are positioned as illustrated in the corresponding schematics of the valves during portions of the regeneration cycle;

FIG. 38a is a schematic illustration of the two valve units and interconnecting manifold of the present invention with the valves properly positioned and arrows indicating the fluid flow, for the backwash cycle;

FIG. 39a is a schematic illustration as in FIG. 38a, but with the valves positioned and the fluid flow indicated by arrows, for the chemical draw cycle of the present invention;

FIG. 40a is a schematic illustration as in FIG. 38a, but with the valves positioned and the arrows indicating fluid flow, for the rinse cycle of the present invention;

FIG. 42 is a vertical cross sectional view through the tank illustrating the cation and anion mixing cycle with arrows indicating the direction of air flow; and FIG. 43 is a vertical cross sectional view through the tank with arrows indicating the direction of liquid flow during the service cycle.

DETAILED DESCRIPTION OF THE PREFERRED EMBODIMENT

Figure 1:
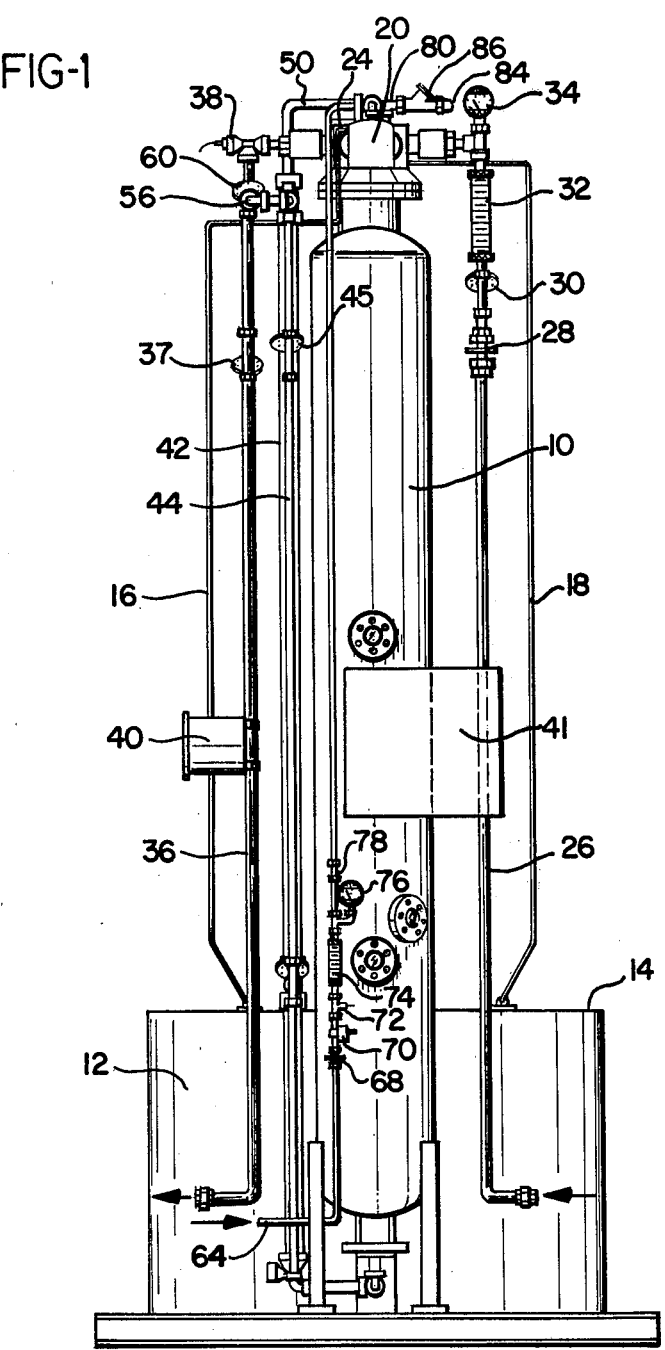
FIG. 1 is a front elevational view of a mixed bed deionizer tank installation in accordance with the preferred embodiment of the present invention.

The mixed bed deionizer tank 10 of the present invention is illustrated in FIG. 1 in a normal installation with the necessary external supply lines, drainage lines, etc. A caustic storage container 12 and acid storage container 14 are positioned adjacent the tank 10 and provided with supply lines 16 and 18, respectively, which extend to the top of the tank and connect to a pair of multi-function valve assemblies 20 and 22 (see FIG. 2). That is, the supply line 16 from the caustic storage container 12 is connected to multi-function valve assembly 20 and supply line 18 from the acid storage container 14 is connected to the multi-function valve assembly 22. Both of the valve assemblies 20 and 22 are, in turn, mounted on a manifold 24 which provides passageways, as described in detail below, to introduce the acid and caustic solutions, raw water, rinse water, etc., to the tank, and remove the deionized water and regeneration waste water from the tank.

Raw water is introduced into the manifold 24 through supply pipe 26 which is provided with a manual shut-off valve 28, an inlet diaphragm valve 30, which is computer controlled, as described below, an inlet flow meter 32 and an inlet pressure gauge 34. Deionized water leaves the tank 10 through the manifold 24 and the outlet pipe 36. A conductivity cell 38 is connected in the corner joint of the outlet pipe 36 and engages the deionized water flowing through the pipe 36 to test the conductivity of the deionized water, which is a measure of the quality of the water. A diaphragm shut-off valve 37 is positioned in the outlet pipe 36 as an outlet water shut-off and fail safe valve. A conductivity monitor 40, which is conventionally available, is mounted to the outlet pipe 36 at a position for easy viewing so that the operator can monitor the quality of the deionized water coming from the tank 10. A water softener digital control programmable timer 41, such as that available from Teccor Electronics, Inc., of Euless, Texas, can be utilized for operating all of the automatically controlled valves, described below, in proper sequence, and since the circuitry associated therewith is state-of-the-art it will not be discussed in detail herein.

Figure 2:
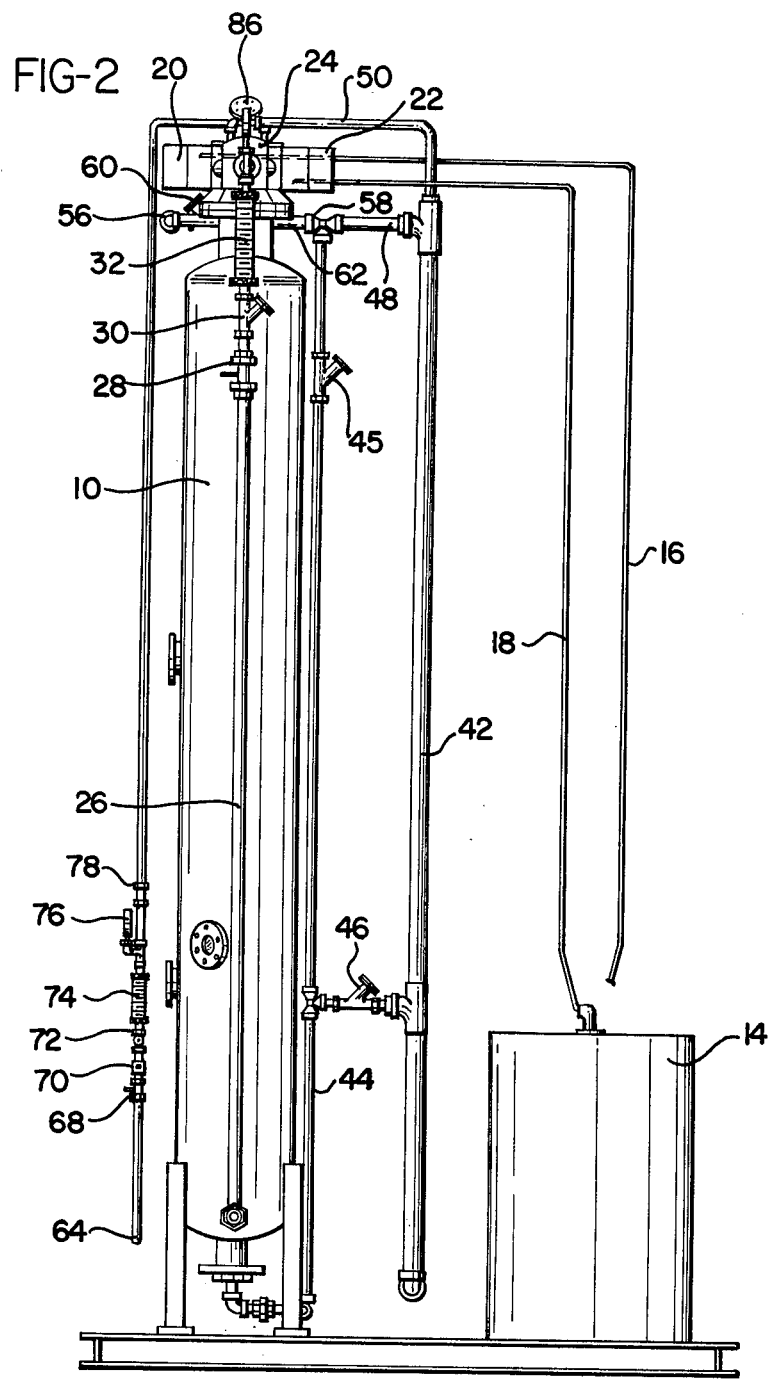
FIG. 2 is a right side elevational view of the embodiment of FIG. 1.
Figure 3:
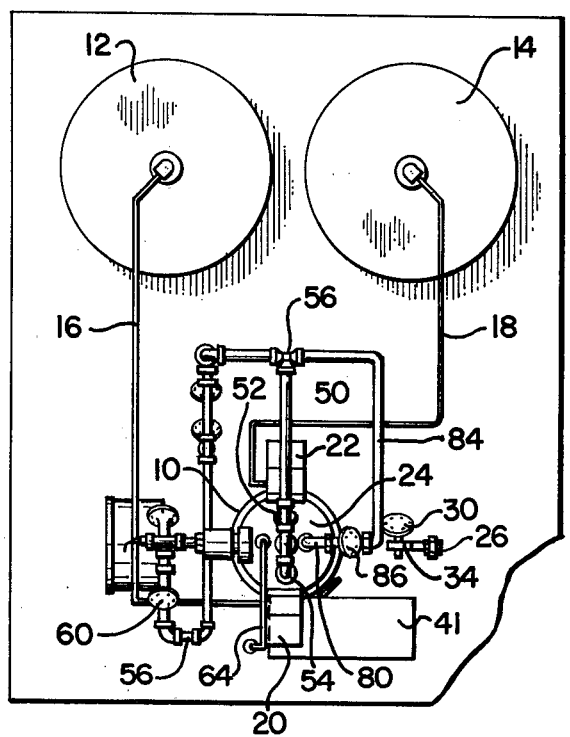
FIG. 3 is a top plan view of the embodiment of FIG. 1.

A main drain line 42 (best seen in FIG. 2) is connected through several smaller drain lines to both the top and bottom of the tank for removing the expended solutions of caustic and acid and the rinse water after regeneration of the tank. One of the smaller drain pipes 44 connects to the bottom of the tank and contains a chemical drain valve 45, as best seen in FIG. 2, and extends upwardly along the side of the tank to be interconnected to the main drain pipe 42 through the lower drain down valve 46 and through the cross pipe 48 at the top of the tank 10. A second small drain pipe 50 extends from the top of main drain pipe 42, as seen in FIG. 2, over the top of the manifold where it is connected to two drain passageways 52 and 54, as best seen in FIGS. 3 and 8, which extend into the tank, as described in more detail below. Also, the outlet pipe 36 is connected through the U-shaped pipe section 56 to drain line 44, and to cross pipe 48 and thus main drain line 42 through the T-joint 58. An automatically controlled purge valve 60 in the U-shaped pipe section 56 allows outlet water, which would normally go through outlet pipe 36, as seen in FIG. 1, to pass to drain during the purge cycle described below.

A pressurized air inlet pipe 64 (see FIGS. 1 and 2) is connected to an air inlet passageway 66 in manifold 24, as shown in FIG. 8, and is provided with a manual shut-off valve 68, a computer controlled solenoid valve 70, a pressure regulator 72, a flow meter 74, a pressure gauge 76 and a check valve 78.

An air vent pipe 80 (see FIGS. 1 and 3) is also provided which connects to the air vent passageway 82, as shown in FIG. 8, in the top of manifold 24. The air vent pipe 80 is connected by pipe 84 through an automatically controlled air bleed diaphragm valve 86 to the drain pipe 50 (see FIG. 3).

The above described piping is the only external piping associated with the mixed bed deionizer unit of the present invention. The remainder of the fluid passageways, which are essential for the various cycles of regeneration of the mixed bed deionizer, are contained within the tank 10, manifold 24 and multi-function valve assemblies 20 and 22, as described in detail below.

One important aspect of the present invention is the internal liquid distribution and drainage system contained within the tank 10, as illustrated in FIGS. 4 through 7. As seen in the cut away view of the tank 10 of FIG. 4, during the service cycle, i.e. when water is normally being deionized by being run through the mixed bed deionizer unit, water is initially introduced into the top of the tank through a multiple port liquid distribution system, or a spray type head 88 at the top of the tank, and flows down through the mixed bed of anion, cation and inert resins, in the direction of the arrows in FIG. 4. The deionized water then passes through a filtering distributor 90 in the bottom of the tank 10, which prevents escape of the resins, and then the deionized water passes upward through the central stand pipe 92 and out through passageways in the manifold 24, described below, which extend to the service water outlet pipe 36.

Figure 4:
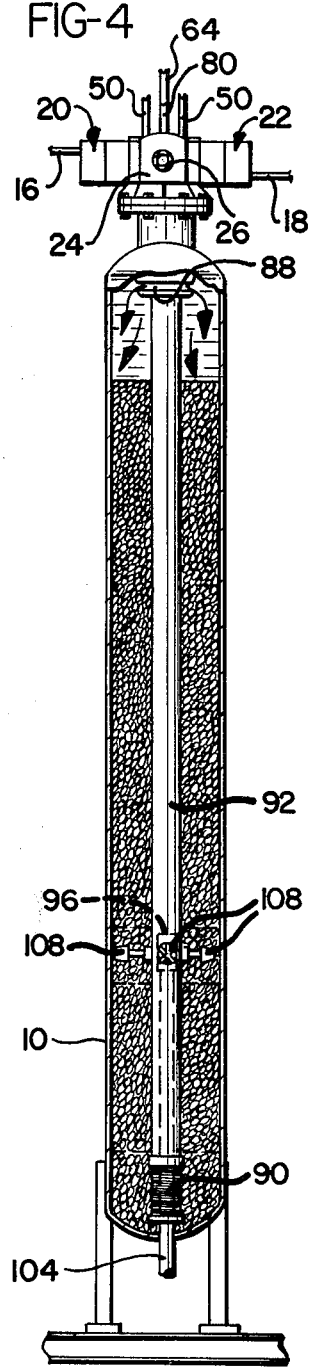
FIG. 4 is a partial cross sectional view of the deionizer tank.

Contained within the central stand pipe 92 at the location where the inert resin would settles after the resins have been separated for regeneration, as indicated by the phantom lines in FIG. 4, is a fluid flow distribution block 96. As shown in FIGS. 6 and 7, this distribution block has a set of four passageways 98 which extend vertically through the block and permit the upward flow of deionized water through the central stand pipe 92 during the service cycle. Offset 45° in a horizontal plane from the positions of the set of four liquid passageways 98 are four liquid drain passageways 100 which extend horizontally through the block 96, as best seen in FIGS. 5 and 6. Each of the passageways 100 open into a central vertical bore 102 which is blind at the top of the block 96, as seen in FIG. 7, and opens at the bottom of the block. A drain pipe 104 is fitted into this open end of bore 102 and extends to the bottom of the tank 10 and is connected to the drain line 44, as seen in FIG. 2.

The outer ends of passageways 100 are in alignment with corresponding holes drilled in the sides of pipe 92 and are tapered and threaded to receive correspondingly tapered and threaded pipes 106, each of which extends horizontally outward into the tank 10. A filtering distribution element 108 is mounted on the end of each pipe 106 and prevents the resin from being drawn into the drain.

This internal liquid distribution and drainage system takes the place of a substantial amount of external piping utilized in conventional mixed bed deionizers. Since there are no valves directly associated with the system internally of the tank, there is generally no need to remove this distribution and drainage system from the tank for servicing. It therefore provides substantial improvements over the external piping system utilized on conventional mixed bed deionizers.

Referring now to the manifold 24 as illustrated in FIGS. 8 through 22, in its preferred form it is constructed from a single molded piece of plastic and is attached to the top of the tank 10 through the flange 110 (see FIG. 9) which bolts to a corresponding metal flange 112 welded to the top of the tank 10. Looking at the bottom of the manifold 24, as shown in FIG. 11, the inlet to the tank during the service cycle of operation is in the form of an arcuate channel 114 molded into the central region of the manifold. The deionized water outlet from the tank is in the form of a circular passageway 116 also molded in the central region of the manifold and which has an outwardly extending flange 118 which matingly engages and receives the central pipe 92.

As shown in FIG. 8, the raw water supply pipe 26 is bolted to the manifold 24 in registry with a large diameter circular bore 120 extending with a horizontal axis into the central region of the manifold, but which does not directly connect to the inlet arcuate passageway 114, and instead has a blind bottom forming a common wall between the bore 120 and the arcuate passageway 114. As shown in the sectional view of FIG. 15, the inlet water flows diagonally from the bore 120 through smaller diagonally extending passageways 122 and 124 which, in turn, intersect horizontally extending passageways 126 and 128, respectively, which open out of opposite sides of the manifold 24.

During the service cycle both of the multi-function valve assemblies 20 and 22 are closed off from the water flow, as described above, so that essentially only the manifold and the central distribution system, described above, are operative during normal service operation. The outlet ends of each of the passageways 126 and 128 open into cavities 130 and 132, respectively, which are capped by the multi-function valve assemblies 20 and 22, respectively. Since the valves of the multi-function valve assemblies are inoperative during the service cycle, the water will pass into the cavities 130 and 132 and proceed to the passageways 134 and 136, as shown in FIGS. 18 and 19, and which have their opposite ends opening into the arcuate passageway 114 which opens into the top of the tank 10.

After the water has passed through the deionizer tank 10 and up through the central pipe 92, it enters the manifold 24 through the circular passageway 116. As shown in FIG. 16, a pair of horizontally disposed circular passageways 138 and 140 extend through the manifold and open on opposite sides thereof. The outer ends of passageways 138 and 140, as shown in FIGS. 20 and 21, open into cavities 142 and 144, respectively. As mentioned in connection with the inlet side, the multi-function valves 20 and 22 are inoperative during the service cycle and essentially act as a cap for the cavities 142 and 144. This causes the outlet water from the tank to pass through the cavities 142 and 144 into passageways 146 and 148, as seen in FIGS. 15, 20 and 21, which passageways are, in turn, connected, respectively, to horizontally, diagonally extending passageways 150 and 152. Passageways 150 and 152 open into the main outlet bore 154, as seen in FIG. 15, which, in turn, opens out of the manifold and is connected to the outlet service pipe 36 which is bolted to the manifold 24.

The remaining passageways through the manifold 24 are utilized during the regeneration cycles, as are most of the passageways described above. As shown in FIG. 17, an air inlet passageway 66 extends into the upper end portion of circular passageway 116. Likewise, the venting passageway 82 extends into the upper portion of arcuate passageway 114. As shown in FIG. 16, an acid solution inlet passageway 156 extends horizontally, diagonally into the passageway 140 which, in turn, opens into the circular passageway 116. Likewise, a caustic solution inlet passageway 158 extends from the opposite side of the manifold 24 horizontally, diagonally into the passageway 136 which, in turn, opens into arcuate passageway 116.

This arrangement of passageways 156 and 158 is what permits the simultaneous regeneration of both the anion and cation resins. The acid solution is passed down the central pipe 92 from the circular passageway 116 which thus introduces the acid solution into the lower portion of the tank 10 where the cation resin is disposed. Likewise, the caustic solution is introduced through the arcuate passageway 114 into the top of the tank where the anion resin is disposed.

As shown in FIG. 22, the drain passageways 52 and 54 are interconnected to the slotted passageways 160 and 162, respectively, which extend out opposite sides of the manifold 24 and into the multi-function valve assemblies 20 and 22 for the purposes described below. Also opening into the drain passageways 52 and 54 are further circular passageways 164 and 166, respectively, which also extend out opposite sides of the manifold 24 into the multi-function valve assemblies 20 and 22. Reduced diameter inserts 168 and 170, are respectively positioned in passageways 164 and 166.

As shown in FIGS. 18 and 19, the passageways 172 and 174 are connected to the passageways 128 and 126, respectively, and extend vertically, diagonally out to opposite faces of manifold 24 and open onto associated openings in the multi-function valve assemblies 20 and 22. These particular passageways 172 and 174 provide the control water supply to the multi-function valve assemblies 20 and 22 during the regeneration cycles, as described below.

Referring to FIGS. 20 and 21, a further pair of passageways 176 and 178, respectively, are interconnected with the passageways 146 and 148 and extend vertically, diagonally therefrom to opposite faces of the manifold 24 in registry with appropriate ports in the multi-function valve assemblies 20 and 22, as described below. These passageways 176 and 178 provide an interconnection between the water input and the circular passageway 116 through the multi-function valve assemblies 20 and 22 and thus supply water to the central pipe 92 to pass water to the bottom of the tank during part of the regeneration process when this is necessary, as described below.

Thus, the manifold 24 and all of the various passageways described above work in unison with the multi-function valve assemblies 20 and 22, whose details are set out below, to provide an extremely compact and simple unitary manifold which eliminates a substantial portion of the piping and valving associated with conventional mixed bed deionizers in which the resins are regenerated within the tank. The use of the molded unitary manifold is therefore substantially less expensive than the prior art arrangements and requires no maintenance whatsoever.

Figure 9:
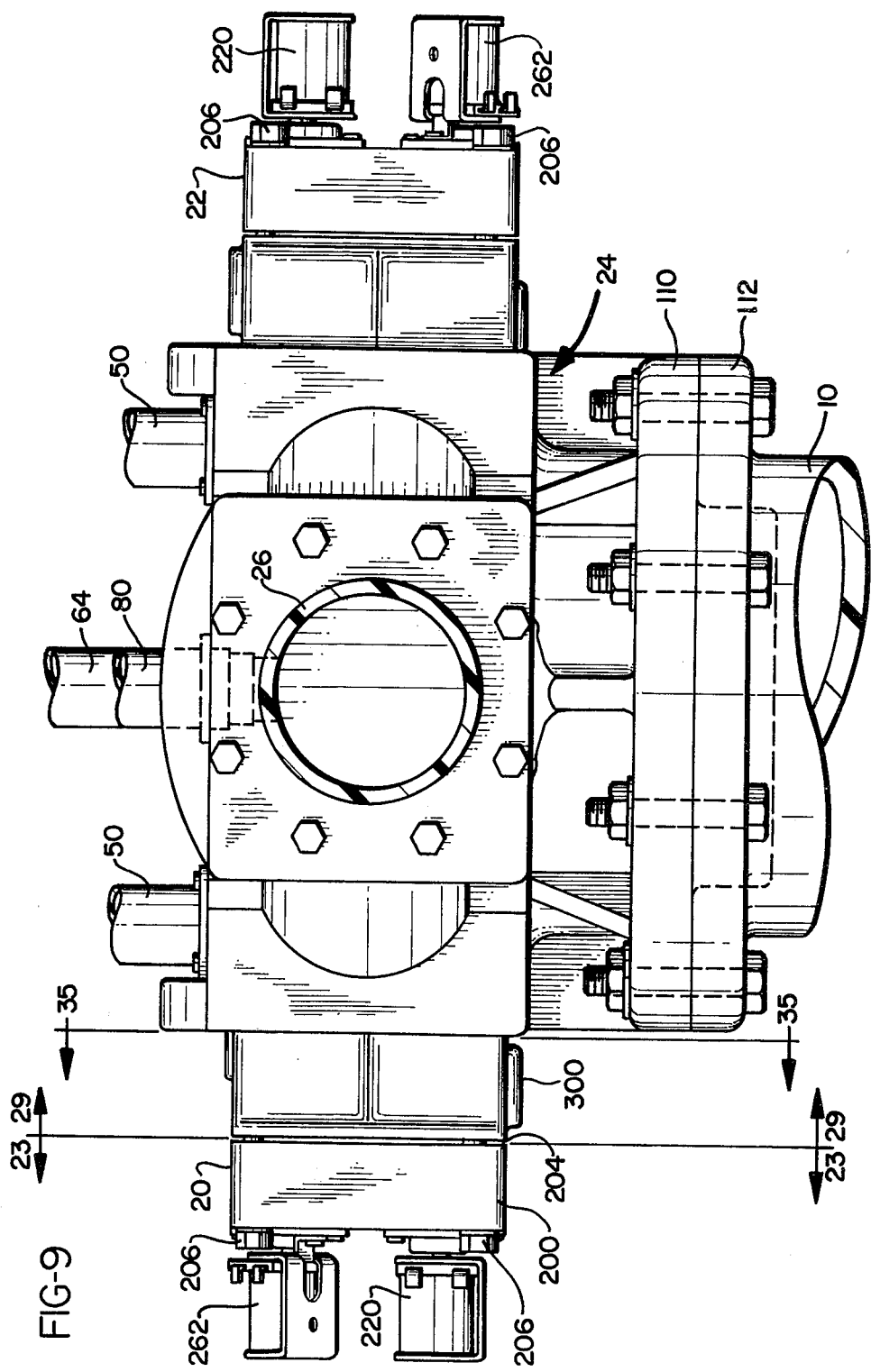
FIG. 9 is a side elevational view of the manifold looking in the direction of the inlet passage.
Figure 13:
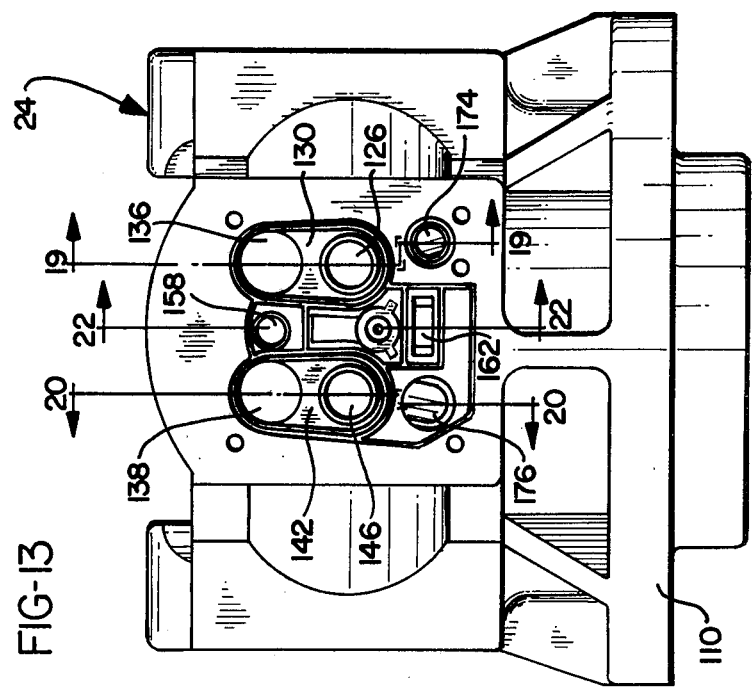
FIG. 13 is a left side elevational view, looking in the direction of line 13—13 of FIG. 10, of the manifold, which in the preferred embodiment, is the caustic solution input side.
Figure 12:
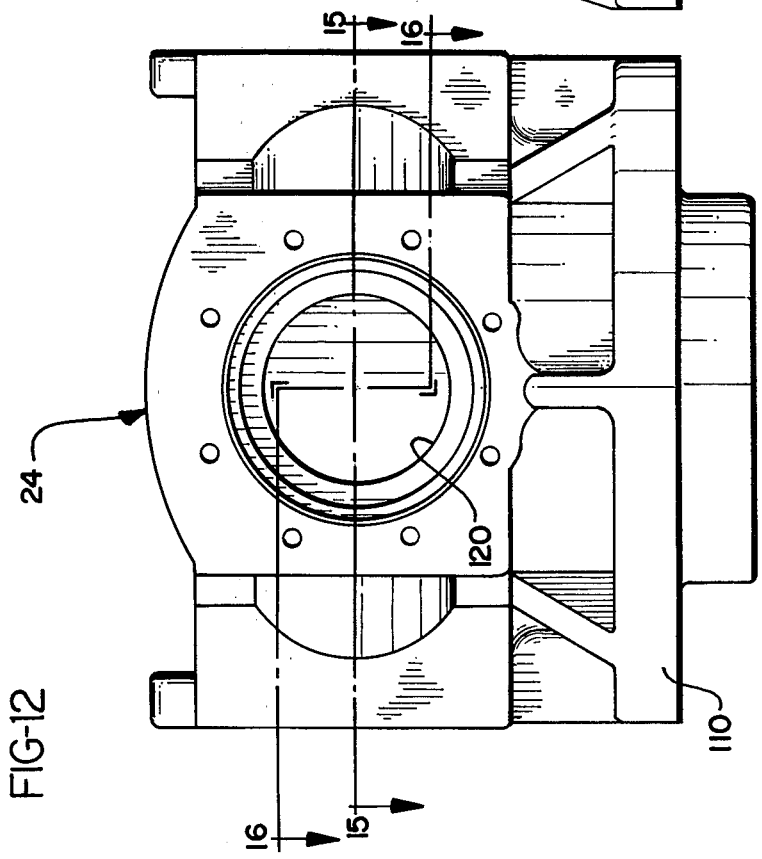
FIG. 12 is a side elevational view of the manifold looking toward the inlet passageway.

Referring now to the construction of the two multi-function valve assemblies 20 and 22, it is to be first noted that the valve assemblies are identical and, therefore, only multi-function valve assembly 20, which is associated with the caustic solution input side of the manifold, will be described in detail. It is to be understood that the multi-function valve assembly 22 is constructed the same and operates in an identical manner to valve assembly 20. Also, it is to be initially noted that when the valve assemblies 20 and 22 are attached to the manifold, one is inverted 180° with respect to the other. This can be seen from a comparison of the two side views of FIGS. 13 and 14 which show the mating ports of the manifold which correspond to ports on each of the valve assemblies. As shown in FIG. 9, the valve assembly 20 is basically composed of two parts, a top part 200 and a bottom part 300. An intermediate combined diaphragm and gasket member 204 is mounted between the two parts and the assembly is bolted together and to the side face of the manifold 24 with a plurality of bolts 206, one at each of the four corners of the assembly.

Referring to FIG. 23, which is looking at the bottom of top part 200, the water which is utilized in the valve assembly 20 for controlling water flow into and out of the tank 10 is initially received through the screen filter 208 and enters the cavity 210 in the top part 200 (see FIG. 34). Cavity 210 is, in turn, connected to an arcuate cavity 212 which is approximately a quarter annular segment and extends normal to the cavity 210 further into the body of the top part 200 and opens into an annular recess 214 which is concentric with a cylindrical passageway 216. The annular recess 214 and cylindrical passageway 216 are separated by an annular wall 218, the outer end of which forms a seat to receive a first solenoid valve 220.

Solenoid valve 220 has an armature 222 which seats in the center of a diaphragm 224 having a depending rim portion 226 which is received within an annular recess 228 in top part 200. The diaphragm 224 has an aperture 230 extending through the side thereof to permit water under pressure to pass through the diaphragm 224 from the annular recess 214 to pressurize the opposite side of the diaphragm and hold it seated on the upper edge of the annular wall 218 while the armature 222 is biased by a spring (not shown) against a central orifice 232 which extends axially through the center of diaphragm 224. When the solenoid valve 220 is activated to lift the armature 222 off of the top of diaphragm 224, orifice 232 is opened so that the pressure is reduced on the opposite side of the diaphragm from the annular recess 214 to upset the previous pressure balance above and below the diaphragm and thus cause the diaphragm to lift off of the seat on the top of annular wall 218 and thus allow water to flow through the passageway 216.

Passageway 216 opens into a cavity 234 which, as seen in FIG. 23, extends in an elongated shape across the bottom surface of the top part 200 and is intersected by a small circular passageway 236. As seen in FIGS. 23 and 25, passageway 236 intersects a further passageway 238 which opens into a cylindrical recess 240 in the bottom face of top part 200. Cylindrical recess 240 is, in turn, connected through a slotted passageway 242 to a cylindrical recess 244 which has a conical outer surface 246 for mating with a diaphragm valve portion of combined diaphragm and gasket member 204, as described below. Thus, when solenoid valve 220 is activated, water will flow through the passageway 216 into the elongated cavity 234, through passageways 236 and 238 into the cylindrical recess 240 and pass through the slotted passageway 242 into the recess 244.

Referring again to the arcuate cavity 212, although there is a vertical wall 248 which defines one side of the cavity 212, since the cavity 212 intersects the annular recess 214 water will flow under the wall and into the further annular cavity 250 and thus into the recess 252 which opens into the bottom face of the top part 200. Recess 252 is interconnected through a corresponding recess in the bottom part 300, described below, to a further contoured recess 254 in the top part 200, as seen in FIG. 23. This recess 254, in turn, opens into an annular recess 256 which extends into the body of top part 200 concentrically around a circular passageway 258 in a manner similar to the way passageway 212 extends concentrically around the circular passageway 216. At the opposite end of passageway 258, as seen in FIG. 26, is an annular recess 260. A second solenoid valve 262, which is identical to first solenoid valve 220 is mounted concentrically over the end of circular passageway 258 and annular recess 260 and operates in the same manner as first solenoid valve 220 and will therefore not be described in greater detail.

When solenoid valve 262 is energized water will pass through the passageway 258 and enter a recess 264 which opens into the bottom face of top part 200. In addition, a slotted passageway 266 and a circular passageway 268 will pass water from the circular passageway 258 to a further shallow cylindrical cavity 270 which also opens into the bottom face of top part 200. As shown in FIG. 28, the cylindrical cavity 270 connects to a circular passageway 272 which contains a check valve 274. Check valve 274 is accessible from the outside of the top part 200 by a plug screw 276. The back side of the check valve 274 in the widened portion of the circular passageway 272 is connected by a circular passageway 278 to a large cylindrical recess 280 in the bottom face of top part 200, as seen in FIGS. 23 and 28. Referring to FIGS. 23 and 24, the cylindrical cavity 270 is also interconnected to a second large cylindrical recess 282 through passageways 284 and 286.

Referring to FIGS. 23 and 27, the circular passageway 216 and cavity 234 are also interconnected to the cylindrical recess 280 through passageway 288 and a smaller passageway 290. In the center of each of the cylindrical recesses 280 and 282 are deeper cylindrical cavities 292 and 294, respectively, with segmented cone protrusions 296 and 298 which provide channels through which water may easily escape cavities 292 and 294. The cavities 292 and 294 merely permit movement of valve stems, described below, which are mounted in the bottom part 300 of the multi-function valve assembly 20.

Referring now to the bottom part 300 of the multi-function valve assembly 20, as seen in FIGS. 29 through 33, 35 and 36, the bottom part 300 is shown with the diaphragm/gasket member 204 in position on the bottom part since the diaphragm gasket member interacts substantially with components of the bottom part. The outline of the entire gasket member 204 is substantially co-extensive with a rib 302 which fits in a corresponding recess in the top part 200. There is a similar rib which fits in a corresponding recess in the bottom part 300, both ribs providing a seal completely around the periphery of the mating surfaces of parts 200 and 300.

As seen in the lower right hand portion of FIG. 29, the screen filter 208 extends into the bottom part 300 through a large contoured cavity 304 and supplies control water to the bottom part 300. Cavity 304 extends into the central region of bottom part 300 through a necked down portion 306 and into a remote end portion 308 which, when assembled to the top part 200 is in alignment with the recess 254 to supply water thereto, as mentioned above. Likewise, the portion 310 of cavity 304 is in alignment with recess 252 to supply water thereto.

Referring to FIG. 33, a pair of liquid pressure actuated valve means in the form of piston assemblies 312 and 314 are shown positioned in their respective cavities 316 and 318. Each of the piston assemblies 312 and 314 includes a valving element in the form of pistons 320 and 322, respectively, which are formed by applying a synthetic rubber coating to a rigid base member formed with conical surfaces 324, 326, 328 and 330. The internal conical surfaces 324 and 328 seat with corresponding surfaces 332 and 334, respectively, which are formed in the surface of bottom part 300, and the external conical surfaces 326 and 330 engage corresponding surfaces on the ports formed by passageways 126 and 146, respectively, in the surface of manifold 24.

The liquid pressure actuated piston assemblies 312 and 314 also include piston guides 332 and 334, respectively, which have stepped upper end portions and have their lower ends threaded to receive the respective pistons 320 and 322. Plastic piston supports 336 and 338 are concentrically mounted to the guides 332 and 334 and have extended shank portions 340 and 342, respectively, which extend through corresponding bores in the bottom part 300 and which are further provided with seals 344 and 346 which prevent leakage of liquid from the area of the pistons 320 and 322 into the cavities 316 and 318, respectively. Each of the piston guides 332 and 334 extend through an opening in the diaphragm-/gasket member 204, and specially shaped piston caps 348 and 350 are mounted to the guides and hold the diaphgram/gasket member 204 against the upper surface of the piston supports 336 and 338 to provide a seal therebetween. The piston caps 348 and 350 are generally disc-shaped and have circular bottoms with a central aperture to receive the top ends of the piston guides 332 and 334, an upwardly and slanting vertical wall with spaced apart draining apertures therein, and a top annular horizontally extending flange.

The cavities 316 and 318 are interconnected by the passageways 352 and 353 to relieve liquid pressure on the back sides of the piston supports 336 and 338 in conjunction with a drainage passageway 354 (see FIG. 35) which extends from the cavity 318 to a slotted drainage passageway 355 in the base of the bottom part 300.

As seen in FIGS. 29, 30 and 33, a slotted passageway 356 intersects an annular cavity surrounding the lower end portion of the shank portion 342 of the piston assembly 314, just above the seat for the conical surface 328 so that when the piston assembly 314 is moved outwardly from the seat water will pass around the piston 322, into the annular cavity 358 and down the slotted passageway 356. As shown in FIG. 30, the opposite end of the passageway 356 opens through a circular aperture 360 into a cylindrical cavity 362. The top of cavity 362 is closed by a flexible cylindrical cap 364 formed in the diaphragm/gasket member 204 which seals around the entire upper periphery of cavity 362. A cylindrical plastic insert member 366 is positioned in cylindrical cavity 362 and has a central support wall extending along an internal diameter 368 and a plurality of radially extending spokes 370 which maintain the insert member 366 centrally within the cavity 362 over the aperture 360. With the cap 364 in the expanded position, as shown in FIG. 30, water will flow through the insert member 366 and over the upper side edges thereof and down into the cavity 362. When the cap 364 is pressed downward against the upper edges of the walls of the insert member 366 it seals it off and prevents water from flowing over the sides into the cavity 362, as described below.

After the water has passed over the upper edges of the walls of insert member 366 and into the cavity 362 it then passes through the large circular passageway 372 which, as shown in FIG. 35, extends toward the bottom face of the bottom part 300 and opens into a generally rectangular recess 374 in the bottom face of the bottom part 300. When the multi-function valve assembly 20 is positioned on the manifold 24 the slotted drainage opening 354 is aligned with slotted passageway 162 in the manifold and the rectangular recess 374 is aligned with the reduced diameter insert 170 which is positioned in passageway 166 in the manifold and which, in turn, empties into the drainage passageway 54 to control the water flow rate.

Referring now to FIGS. 31 and 32, which illustrate the valving and passageway arrangement for the caustic solution draw, the caustic solution supply line 16 is secured by a conventional connector arrangement 376 to an input passageway 378. Passageway 378 empties into the lower cylindrical chamber 380 of the check valve 382 which is mounted on a conical seat between the lower chamber 380 and an upper chamber 384. A circular disc cap 386 of slightly larger diameter than upper chamber 384 sets in a corresponding recess in the upper surface of the upper part 300. The disc cap 386 has a central semi-spherical protrusion 388 which extends concentrically into the upper chamber 384 and limits the upward movement of check valve 382.

A slotted opening 390 in the side wall of upper chamber 384 opens into a further cylindrical chamber 392 in which is positioned a spool-like insert 394 which has a central opening 396 extending therethrough in alignment with a circular passageway 398 extending into the body of the bottom part 300. As shown in FIG. 32, the passageway 398 is intersected by a diagonally extending passageway 400 which, in turn, extends upward into a cylindrical recess 402 in the surface of bottom part 300. The cylindrical recess 402 is in alignment with an opening in the diaphragm/gasket member 204 and is in further alignment with circular passageway 258 in top part 200 to allow water to pass from the passageway 258 into the recess 402 and through the passageways 398 and 400 to come out of the spoollike member 394 and into the chamber 392 where it mixes with the caustic solution being drawn from the supply line 16.

Referring again to FIG. 31, the chamber 392 is connected to passageway 404 which opens into a cylindrical cavity 406 housing a suction or injection jet member 408 which has a central conical bore 410 which opens at a reduced diameter at the level of passageway 404 to produce a jet pump effect which draws the caustic from the line 16. The bottom of cavity 406 enters a passageway 412 which has a check valve 414 positioned therein to prevent water from going in the direction of the jet member 408 and from causing back pressure on the caustic supply. The cylindrical protrusion 416 extending from the bottom side of bottom portion 300 is matingly received in the caustic inlet passageway 158 of manifold 24 when the bottom part 300 is mounted to the manifold, and thus introduces the caustic solution into the arcuate passageway 114 of the manifold. A spoked retainer member 418 fitted into the outer end of cylindrical protrusion 416 prevents the check valve 414 from being expelled from the cylindrical protrusion 416.

Referring again to FIG. 31, the diaphragm/gasket member 204 lies across the top of disc cap 386 and holds it in position when the valve assembly is assembled. A frustroconical protrusion 418 is formed in the diaphragm/gasket member 204 concentrically above the spool-like insert 394 and can be flexed downwardly to seal off the opening 396 when pressure is applied to the upper surface of the protrusion 418. Protrusion 418 is also in alignment with the cylindrical recess 240 in top part 200 when assembled, which is where the pressure is applied to force the protrusion 418 down against the spool-like insert 394 when caustic is to be supplied to the tank, as described in more detail below.

Referring now to FIGS. 29 and 35, a small diameter bleed-off passageway 420 formed by an insert in a larger diameter bore extends through the bottom part 300 and provides a passageway which interconnects circular passageway 258 in top part 200 with the slotted drainage passageway 355 in the base of bottom part 300 which, in turn, opens into slotted passageway 162 in the manifold which is interconnected to the drain passageway 54.

Referring to FIGS. 29, 35, and 36, a check valve 422 is positioned in cylindrical passageway 424 in bottom part 300. Passageway 424 extends completely through the bottom part 300 and interconnects with cavity 234 in top part 200 which, in turn, connects to the circular passageway 216 extending from the solenoid valve 220. The opposite end of passageway 424 aligns with passageway 176 which interconnects with the circular passageway 116 extending into the tank, via passageways 146 and 138 in manifold 24.

Operation

The above description basically describes each component of the present invention and the various passageways through which the main flow of water as well as the control water flow pass through the device. Set out below is a description of the preferred order of functioning of the present invention. Proper sequencing of operation of the various solenoids and automatic control valves, as described above, is accomplished with a miniature computerized timing circuit of conventional construction which constitutes no part of the present invention except in the sense that it properly sequences the valves automatically in the correct order as set out below.

During the normal service cycle of the mixed bed deionizer of the present invention the various resins in the tank are intermixed as shown in FIG. 4. Also, during service, the multi-function valve assemblies 20 and 22 are inoperative with the valve elements 320 and 322 in the retracted position, as shown in FIG. 33, so that the passageways 126, 128, 146, and 148 in manifold 24 are open (see FIG. 15). Raw water thus passes through the inlet bore 120, through passageways 122 and 126 into the cavity 130, and through passageways 124 and 128 into the cavity 132, as shown in FIG. 15. The water then passes through the cavities 130 and 132 into the passageways 136 and 134, respectively, which, in turn, as shown in FIG. 16, empty into passageway 114 which opens directly into the top of the tank 10.

As shown in FIG. 4, the water then passes down through the resins and is thus deionized, and thereafter passes up through the distributor 90 and central pipe 92 into passageway 116. From there, the deionized water enters passageways 138 and 140, as shown in FIG. 16, and then passes through the cavities 142 and 144, respectively, and from there, as shown in FIG. 15, goes through passageways 150 and 152 into the outlet bore 154 and then to the service line. During the service cycle the inlet valve 30 is maintained open which permits the inflow of raw water to the tank, and the valve 37 on the outlet pipe 36 is maintained open to allow water to pass through the outlet pipe. The remaining exterior valves 45, 46, 60, 70, and 86 remain closed during the service cycle.

Backwash Cycle

When regeneration of the deionizing resins is desired the resins are initially backwashed in order to separate the anion, cation and neutral resins. During the backwash cycle the above mentioned closed valves remain closed, in addition, valve 37 is closed which leaves only valve 30 open.

Figure 38B:
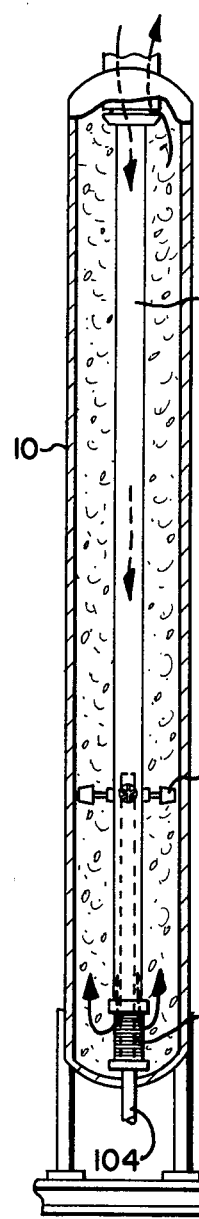
FIG. 38b is a vertical cross section through the tank illustrating the direction of fluid flow during the backwash cycle.

In the multi-function valve assemblies 20 and 22, to initiate the backwash cycle, as illustrated in FIG. 38a, solenoid 220 is activated which causes the armature 222 to lift off the orifice 232 in diaphragm 224 in order to reduce the pressure on the top side of the diaphragm and allows water pressure to push the diaphragm off its seat on the top of the annular wall 218, as described above in connection with FIG. 34, and thus permit water to enter the passageway 216 from the inlet through the screen filter 208 which, in turn, has been supplied with water through the passageway 174 in the manifold 24.

As water enters the passageway 216 it then proceeds through the passageway 288 into the top side of valve element 320 where it causes the valve element to be pressed against the seat in passageway 126, for multi-function valve assembly 20, and against the seat in passageway 128, for multi-function valve assembly 22. As seen in FIG. 38a, this then permits water to flow behind the seated valve through the passageways 136 and 356 into the insert member 366 in cylindrical cavity 362 where it forces the cap 364, which is formed in the diaphragm gasket 208, to be lifted off of the upper walls of the insert 366 and permits the water to pass into the surrounding cavity 362. The water then flows from the cavity 362 through the passageway 372 and into the passageway 162 in the manifold where it then proceeds to the drain passageway 54 and from there to drain.

Water entering the passageway 216 also proceeds through the bleed-off passageway 420, which is of smaller diameter than the passageway 216 and is illustrated schematically in FIG. 38a as a reduced diameter insert, which leads to the slotted passageway 355 which is aligned with a passageway 162 in the manifold and which, as mentioned above, flows into the drain lines 52 and 54 for valve assemblies 20 and 22, respectively. Also, water flowing through passageway 216 enters the cylindrical passageway 424 which contains check valve 422 and which permits the water to flow into the passageway 176 in the manifold 24.

On the caustic solution supply side, which is the multi-function valve assembly 20 side of manifold 24, passageway 176 is, in turn, connected through passageway 146 and cavity 142 in the manifold and from there into passageway 138 which leads to passageway 116 connected to the central pipe and is thus introduced through the distributor 90 in the bottom of the tank 10 to pass up through the tank with sufficient volume flow to cause redistribution and settling out of the resins into their separate groups.

On the acid solution supply side, which is the multi-function valve assembly 22 side of manifold 24, water from passageway 424 flows into passageway 178 in manifold 24 and from there into passageway 148, then through cavity 144 into passageway 140. Passageway 140 is, in turn, connected to passageway 116 which introduces water into central pipe 92, so that all of the input water travels to the bottom of the tank through pipe 92 during the backwash cycle.

It is to be noted that water also passes through passageways 236 and 238 into the cavity 240 to maintain the pressure on the top of the diaphragm above the acid and caustic inlet chambers in order to prevent the caustic and acid solutions from being introduced at this time.

After the backwash cycle has proceeded for a sufficient period of time to produce complete separation of the anion, cation and inert resins, which time depends upon the size of the tank and the volume flow which is established for any given tank, the solenoid 262 is then activated and the chemical draw cycle begins.

Chemical Draw Cycle

Figure 39B:
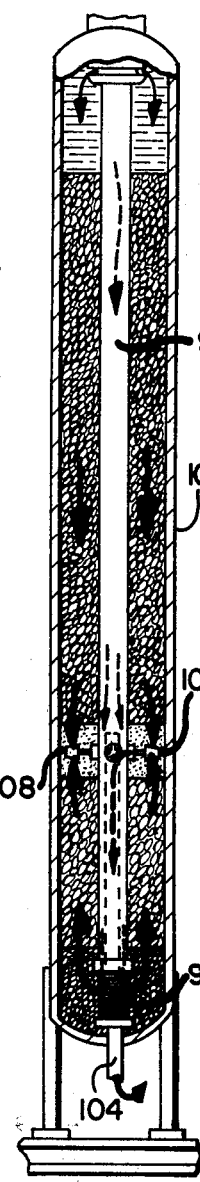
FIG. 39b is a cross sectional view through the tank illustrating the direction of fluid flow during the chemical draw cycle.
Figure 40B:
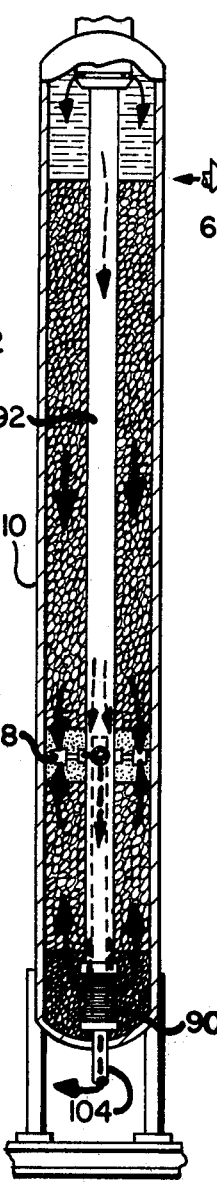
FIG. 40b is a cross sectional view through the tank illustrating the direction of fluid flow during the rinse cycle in the present invention.
Figure 41:
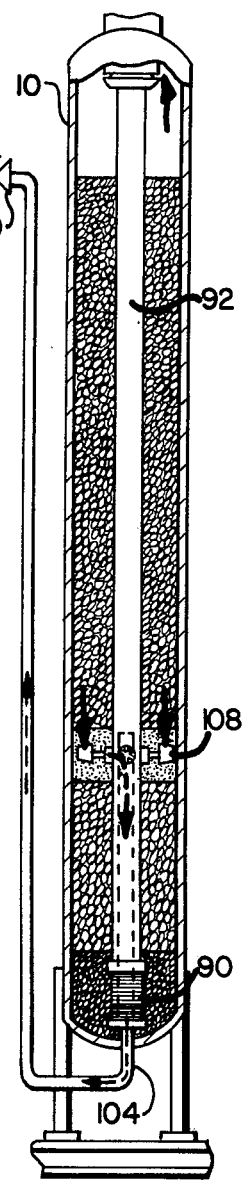
FIG. 41 is a vertical cross sectional view through the tank indicating liquid flow during the drained cycle of the present invention.

The chemical draw cycle is illustrated schematically in FIG. 39a. During this chemical draw cycle is when regeneration of the anion and cation resins actually occurs by the introduction of the caustic solution through the multi-function valve assembly 20 as it comes from line 16 and passes through the manifold 24 into the upper portion of the tank 10 from the passageway 114. Likewise, the acid solution is introduced from line 18 and through the multi-function valve assembly 22 into the passageway 116 and down through the central pipe 92 and thus into the bottom of the tank 10.

As mentioned before, the anion resins, such as a hydroxide form polystyrene, is located in the upper region of the tank during the regeneration, and the cation exchange resin, such as a hydrogen form polystyrene resin, is located in the lower region of the tank, with an inert polystyrene resin in the central region surrounding the fluid flow distribution system comprised of the distribution block 96, pipes 104 and distributors 108 which function, as described above, in connection with FIGS. 5 through 7. During the chemical draw cycle, valves 30 and 45 are open while the remaining external valves 37, 46, 60, 70 and 86 are all closed in order to properly root the solutions during regeneration of the resins in the tank.

Referring to FIG. 39a, to initiate the chemical draw cycle on the caustic solution supply side, which is multi-function valve assembly 20, the second solenoid valve 262 is activated. As with solenoid 220, lifting of the armature of the solenoid 262 causes the diaphragm to lift from the passageway 258 and allow water from the chamber 212 to pass through the passageway 258 into passageway 264. Passageway 264, in turn, leads to the jet member 408 which, in a well-known manner, produces a vacuum on the downstreamed side of the jet causing a reduced pressure in passageway 404 as the water passes through the passageway 412. It then passes through check valve 414 into the manifold 24 through passageway 158 and into passageway 138 which empties into the arcuate passageway 114 in the manifold and thus into the top of the mixed bed tank 10 to pass through the anion resin in the top of the tank.

In addition to passing through passageway 264 into the jet member 408, the water coming from passageway 258 passes through passageway 400 into cylindrical passageway 398. From there it passes into the spool-like insert 394. The water stream passing through the jet member 408 causes a draw of the caustic solution through line 16 past the check valve 382 into the cylindrical cavity 384 beyond which it is mixed with the water coming through the jet member 408. This mixing occurs as the caustic enters into the mainstream in passageway 412 where it is introduced into the passageway 138 and then into the top of the tank above the anion resin through the arcuate passageway 114.

On the acid draw side, which is multifunction valve assembly 22, solenoid valve 262 is activated simultaneously with the solenoid valve 262 on the caustic side and thus the flow through the various passageways is identical with the exception that the passageway 412, which opens into the check valve 414, is disposed in registry with the passageway 156 of manifold 24. Passageway 156 empties into the passageway 140 extending into the central pipe 92 which opens through distributor 90 into the lower portion of the tank and thus introduces the acid solution into the lower region of the cation resin and proceeds to rise to the central distribution system where it is removed through the distributors 108, pipes 106 and into the drain pipe 104 where it empties out of the bottom of the tank.

This chemical draw cycle then continues for the appropriate period of time depending upon the tank size and volume flow of the solution through the anion and cation resins in order to completely regenerate the resins. After this cycle is completed, external valves 30 and 45 remain open while the same external valves closed during the chemical draw cycle, which includes valves 37, 46, 60, 70 and 86 remain closed during the rinse cycle described below.

Rinse Cycle

To initiate the rinse cycle, solenoid valves 220 on both the multi-function valve assemblies 20 and 22 are deactivated which causes the diaphragms to close off passageways 216. However, solenoid valve 262 on both multi-function valve assemblies remains activated which continues to pass water through the jet nozzle 408 and into the top and bottom of the tank through multi-function valve assemblies 20 and 22 and then through arcuate passageway 114 and circular passageway 116 into central pipe 92, respectively. Water continues to pass through passageway 258 into passageway 264 and through jet member 408 into passageway 412 and thus into the top of the tank through arcuate passageway 114.

In addition, water passes through the passageway 268 just prior to entering the jet member 408 and thus maintains the cylindrical cap 364 against the upper walls of the insert member 366 to prevent water from passing therethrough. Also, the water continues through check valve 274 into passageway 278 and cylindrical cavity 280 where it maintains the first valve element, or number one piston, 320 in the closed position. Water also travels from the cavity 270 through passageway 286 into the upper cavity 282 of the second valve element, or number two piston, 322 and thus maintains the number two piston closed as well.

Since the pressure to line 238 has been cut off due to closing of the solenoid valve 220, the water pressure above the diaphragm/gasket member 204 in the regions of check valve 382 and the spool-like element 394 is reduced and water pressure from beneath pushes the diaphragm off element 394 and seats the check valve 382 closed while the water from passageway 398 fills the void created by jet 408 and thus prevents the caustic solution from entering multi-function valve assembly 20 through line 16.

The same conditions exist for the multi-function valve assembly 22, which results in rinse water being introduced through passageway 156 in manifold 24 and through passageway 140 into the central pipe 92 and into the lower region of the tank. The water introduced from both multi-function valve assemblies 20 and 22 thus continues to the central distribution block 96 through the distributors 108 and pipes 106 and thus out the drain pipe 104 in the bottom of the tank 10.

Drain Cycle

To initiate the drain cycle, valves 86 and 46 are opened and valves 30, 37, 45, 46, 60 and 70 are closed. Also, solenoid valves 1 and 2 are both deactivated in each of the multi-function valve assemblies 20 and 22 which causes the respective valve elements 320 and 322 to move to their retracted positions.

Since the inlet valve 30 is closed, no raw water enters the tank and the water which is already in the tank drains through the central distributor block 96 and out the drain pipe 104 in the bottom of the tank. The drain cycle continues for a period of time which is calculated to permit the tank to drain down to approximately the level of the distribution block 96. Thereafter the air mix cycle is initiated.

Air Mix Cycle

During the air mix cycle, valves 70 and 86 are opened and valves 30, 37, 45, 46 and 60 are closed. This causes introduction of air through the air inlet line 64 via solenoid valve 16 and is thus introduced into the top of the tank through the air inlet passageway 66 in the manifold 24. From there, it passes through the central pipe 92 and out through the distributor 90 in the bottom of the tank, which then, together with the remaining water in the tank forces the resins to be mixed. The air is allowed to vent out through the top of the tank through arcuate passageway 114 in the manifold and then passes through the air vent passageway 82 and into the air vent pipe 80 which, in turn, vents to atmosphere through air vent valve 86. This cycle continues for a sufficient period of time to completely remix the resins prior to the tanks being placed in service.

Fill Cycle

During the filling operation subsequent to the air mixing cycle, valves 30 and 86 are opened and valves 37, 45, 46, 60 and 70 are closed. This condition permits raw water to pass into the top of the tank through arcuate passageway 114 via the passageways described above for the normal service cycle. This, again, is a timed situation which continues for a sufficient period of time to allow the tank to be completely refilled with raw water.

Purge Cycle

After the tank has been refilled, valves 30 and 60 are opened and valves 37, 45, 46, 70 and 86 are closed. This condition results in water entering the top of the tank, as in the normal service condition, and leaving the top of the tank through the manifold 24, also as in the normal service condition. Thereafter, however, since valve 46 is closed and valve 60 is open, water will pass through the drain pipe 50 and from there to the main drain pipe 42. This condition will continue until the conductivity cell 38, and the associated conductivity monitor 40, senses that the quality of water is acceptable for service conditions. At this time, the valves 30 and 60 will be opened and valves 37, 45, 46, 70 and 86 will be closed. This will result in the deionized water entering the service line and the mixed bed deionizer device of the present invention being back in service.

Although the foregoing description illustrates the preferred embodiment of the invention, variations are possible. All such variations as would be obvious to one skilled in this art are intended to be included within the scope of the invention as defined by the following claims.

What is claimed is:

1. A mixed bed deionizer device, comprising:
    a tank for containing anion and cation resins therein for deionizing water;
    a caustic solution supply means for supplying caustic solution to the tank;
    an acid solution supply means for supplying acid solution to the tank;
    a raw water supply pipe for supplying water to be deionized to the tank;
    a deionized water outlet pipe for carrying away water which has been deionized in the tank;
    a drain pipe for carrying away the solutions passed through the tank during regeneration of the resins;
    a pressurized air supply pipe for supplying air to the tank for mixing the resins after regeneration;
    a vented air drain pipe for carrying away air passed through the tank for mixing the resins;
    a pair of multi-function valve means one each associated with the acid and caustic solution supply means for controlling flow of the solutions into and out of the tank; and
    at least one manifold means supporting the pair of multi-function valve means and having a plurality of passageways interconnecting the pair of multi-function valve means with the raw water supply pipe, the deionized water outlet pipe, the drain pipe and the tank for routing of ingress and egress of the solutions, the raw water and the deionized water to and from the tank in a predetermined sequence.

2. A mixed bed deionizer device as defined in claim 1 wherein the tank includes a service water outlet pipe opening into a lower region of the tank and extending upward through the tank and connected to the manifold in communication with passageways therein leading to the deionized water outlet pipe.

3. A mixed bed deionizer as defined in claim 2, including:
    time control operating means connected to the multi-function valve means for causing said multi-function valve means to sequentially:
    (a) transfer raw water from the raw water supply pipe to passageways in the manifold extending to the tank and transfer deionized water from the tank to passageways in the manifold which extend to the deionized water outlet pipe during a service cycle,
    (b) transfer raw water from the raw water supply pipe to passageways in the manifold extending to the tank service water outlet pipe and transfer raw water passed through the tank and through passageways in the manifold extending to the drain pipe during a backwash cycle,
    (c) transfer caustic solution to passageways in the manifold extending to an upper region of the tank above the anion resin, transfer acid solution to passagways in the manifold extending to the service water outlet pipe for distributing acid solution in a lower region of the tank beneath the cation resin and transfer the solutions which have passed through the anion and cation resins to regenerate the same from the tank to the drain pipe during a draw cycle,
    (d) transfer raw water from the raw water supply pipe to passageways in the manifold extending into the upper region of the tank and to the service water outlet pipe so as to pass through the cation and anion resins in the tank and transfer to the drain pipe during a rinse cycle,
    (e) shut off all water flow through the manifold passageways and transfer water from the tank to the drain pipe during a drain cycle,
    (f) transfer air from an air inlet pipe through passageways in the manifold extending to the service water outlet pipe and transfer air passed through the tank through passageways in the manifold extending to the vented air drain pipe during an air mix cycle,
    (g) transfer raw water from the raw water inlet pipe through passageways in the manifold extending into the tank during a refill cycle,
    (h) transfer raw water from the raw water inlet pipe through passageways in the manifold into the tank and transfer water passed through the resins in the tank and into the service water outlet pipe through passageways in the manifold extending to the purge drain outlet pipe during a purge cycle,
    quality sensing means disposed in the purge drain outlet pipe for sensing the quality of water passed therethrough; and
    means associated with the quality sensing means for changing water flow from the purge drain outlet pipe during the purge cycle to the deionized water outlet pipe for use during the service cycle.

4. A mixed bed deionizer as defined in claim 1 wherein said at least one manifold means includes a single manifold mounted to the upper portion of the tank and having a raw water supply passageway opening into the upper region of the tank and a service water passageway also opening into the upper region of the tank and matingly receiving the deionized water outlet pipe, said manifold further receiving said pair of multi-function valve means in horizontally opposed positions above said tank, said manifold further having a raw water inlet passageway and a deionized water outlet passageway in horizontally opposed positions at 90° to the positions of said multi-function valve means and interconnected through said multi-function valve means respectively to the raw water inlet passageway in the top of the tank and the supply water outlet passageway in the top of the tank.

5. In a mixed bed deionizer device having a tank containing anion and cation exchange resins, an inlet passageway for introducing raw water to be deionized into the tank, an outlet passageway for removing deionized water from the tank, and means associated with said tank for regenerating the resins in situ, the improvement comprising:
    a central pipe extending through the tank for introducing a regenerative solution in a region of the tank;

a drain pipe of smaller diameter than the central pipe and extending axially therethrough with an end extending out of the tank and an opposite end terminating in a middle region of the tank;

a liquid distribution block within the central pipe and mounted to the opposite end of the drainage pipe and having a plurality of passageways through which liquid in the central pipe can flow past the distribution block;

a plurality of drainage pipes extending radially outward from the distribution block through the walls of the central pipe and into the middle region of the tank for receiving liquid therefrom, the distribution block having further passageways associated with the drainage pipes for receiving liquid therefrom and passing it into the drain pipe; and valve means for closing the drain pipe during service use of the device and for opening the drain pipe during regeneration of the resins.

6. The improvement of claim 5 wherein the tank is cylindrical with its central axis vertically disposed, the central pipe extends parallel to the axis of the tank with an upper end of the central pipe engaging the outlet passageway disposed in an upper region of the tank and a lower end of the central pipe opening into a lower region of the tank for receiving deionized water, and the drain pipe extending coaxially within the central pipe.

7. A method of regenerating a mixed bed deionizer tank containing anion and cation resins, including the steps of:

transferring raw water through first and second multi-function valve means from a raw water supply pipe to passageways in a manifold extending to a tank service water outlet pipe and transferring raw water passed through the tank and through passageways in the manifold extending to a drain pipe, during a backwash cycle;

transferring caustic solution through the first of the multi-function valve means to passageways in the manifold extending to an upper region of the tank above the anion resin;

transferring acid solution through the second of the multi-function valve means to passageways in the manifold extending to a service water pipe which leads to a lower region of the tank beneath the cation resin;

removing the caustic and acid solutions through a drain means in a central region of the tank after the solutions have respectively passed through and regenerated the anion and cation resins;

transferring raw water from the raw water supply pipe to passageways in the manifold extending into the upper region of the tank and to the service water outlet pipe so as to pass through the cation and anion resins in the tank and transfer to the drain pipe during a rinse cycle;

shutting off all water flow through the manifold passageways and transferring water from the tank to the drain pipe during a drain cycle;

transferring air from an air inlet pipe through passageways in the manifold extending to the service water outlet pipe and transferring air passed through the tank through passageways in the manifold extending to the vented air drain pipe during an air mix cycle;

transferring raw water from the raw water supply pipe through passageways in the manifold extending into the tank during a refill cycle;

transferring raw water from the raw water supply pipe through passageways in the manifold into the tank and transferring water passing through the resins in the tank and into the service water outlet pipe through passageways in the manifold extending to a purge drain outlet pipe during a purge cycle;

sensing the quality of the water in the purge drain outlet pipe as it passes therethrough during the purge cycle; and then changing water flow from the purge drain outlet pipe during the purge cycle to the deionized water outlet pipe for use during the service cycle when the quality of the water being sensed reaches a predetermined level.

8. A method of regenerating a mixed bed deionizer as claimed in claim 7 wherein the step of removing the caustic and acid solutions through the drain means includes receiving the caustic and acid solutions in the central region of the tank through a plurality of distributors disposed in a neutral resin region and passing the caustic and acid solutions from the plurality of distributors through a central drain pipe and out through the bottom region of the tank to drain.

* * * * *